United States Patent
Fitzgerald et al.

(10) Patent No.: US 7,420,464 B2
(45) Date of Patent: Sep. 2, 2008

(54) METHODS AND SYSTEMS FOR GATHERING MARKET RESEARCH DATA INSIDE AND OUTSIDE COMMERCIAL ESTABLISHMENTS

(75) Inventors: Joan Fitzgerald, Arlington, VA (US); Jack C. Crystal, Owings Mill, MD (US); Alan R. Neuhauser, Silver Spring, MD (US); James M. Jensen, Columbia, MD (US); David Patrick Forr, Ellicott City, MD (US); Eugene L. Flanagan, III, Wilton, CT (US)

(73) Assignee: Arbitron, Inc.

( * ) Notice: Subject to any disclaimer, the term of this patent is extended or adjusted under 35 U.S.C. 154(b) by 0 days.

(21) Appl. No.: 11/092,497

(22) Filed: Mar. 29, 2005

(65) Prior Publication Data
US 2005/0243784 A1 Nov. 3, 2005

Related U.S. Application Data

(63) Continuation-in-part of application No. 10/800,447, filed on Mar. 15, 2004.

(51) Int. Cl.
*G08B 1/08* (2006.01)
*H04Q 7/00* (2006.01)
*G01S 1/00* (2006.01)

(52) U.S. Cl. .............. 340/539.13; 340/825.49; 705/10; 342/357.07; 342/357.09

(58) Field of Classification Search .......... 340/539.13, 340/573.4, 825.49; 705/7, 10; 235/375, 235/376; 342/357.06, 357.09
See application file for complete search history.

(56) References Cited

U.S. PATENT DOCUMENTS

| | | | |
|---|---|---|---|
| 4,930,011 A | 5/1990 | Kiewit | |
| 5,214,793 A | 5/1993 | Conway et al. | |
| 5,461,390 A | 10/1995 | Hoshen | |
| 5,483,276 A | 1/1996 | Brooks et al. | |
| 5,510,828 A | 4/1996 | Lutterbach et al. | |
| 5,541,585 A | 7/1996 | Duhame et al. | |
| 5,612,741 A | 3/1997 | Loban et al. | |
| 5,764,763 A | 6/1998 | Jensen et al. | |
| 5,848,129 A | 12/1998 | Baker | |
| 5,923,252 A | 7/1999 | Sizer et al. | |
| 5,966,696 A | 10/1999 | Giraud | |
| 6,078,928 A * | 6/2000 | Schnase et al. | 707/104.1 |
| 6,252,522 B1 | 6/2001 | Hampton et al. | |

(Continued)

FOREIGN PATENT DOCUMENTS

WO   WO 91/11062   7/1991

OTHER PUBLICATIONS

A New Positioning System Using Television Synchronization Signals; Matthew Rabinowtiz and James J. Spiker, Jr.; (date unknown) pp. 1-11.

(Continued)

*Primary Examiner*—Jeff Hofsass
*Assistant Examiner*—Anne V. Lai
(74) *Attorney, Agent, or Firm*—Katten Muchin Rosenman

(57) ABSTRACT

Methods and systems for tracking movements of participants in a market research study, for example, outside retail establishments, are provided. The methods and systems employ portable monitors carried on the persons of the participants to gather location data.

75 Claims, 20 Drawing Sheets

| Venue-of-Interest | Time/Date | Duration inside Venue-of-Interest | Duration outside Venue-of-Interest |
|---|---|---|---|
| Advertisement 280b | 9:52 02/25/2005 | 0 | 0 |
| Store 260a | 10:00 02/25/2005 | 13 minutes | 0 |
| Store 260b | 10:15 02/25/2005 | 25 minutes | 0 |
| Advertisement 280a | 10:44 02/25/2005 | 0 | 0 |
| Store 260i | 10:50 02/25/2005 | 60 minutes | 5 minutes |
| Advertisement 280f | 12:20 02/25/2005 | 0 | 1 minute |
| Advertisement 280d | 12:25 02/25/2005 | 0 | 2 minutes |
| Store 260e | 12:30 02/25/2005 | 40 minutes | 0 |
| Store 260h | 13:12 02/25/2005 | 0 | 7 minutes |
| Store 260g | 13:20 02/25/2005 | 30 minutes | 0 |
| Advertisement 280e | 14:00 02/25/2005 | 0 | 0 |

U.S. PATENT DOCUMENTS

| | | | |
|---|---|---|---|
| 6,266,442 | B1 | 7/2001 | Laumeyer et al. |
| 6,286,005 | B1 | 9/2001 | Cannon |
| 6,360,167 | B1 | 3/2002 | Millington |
| 6,396,413 | B2 * | 5/2002 | Hines et al. ............ 340/825.49 |
| 6,438,381 | B1 * | 8/2002 | Alberth et al. ........... 455/456.5 |
| 6,484,148 | B1 | 11/2002 | Boyd |
| 6,507,802 | B1 | 1/2003 | Payton et al. |
| 6,539,393 | B1 * | 3/2003 | Kabala ....................... 707/102 |
| 6,546,257 | B1 | 4/2003 | Stewart |
| 6,571,279 | B1 | 5/2003 | Herz et al. |
| 6,580,916 | B1 | 6/2003 | Weisshaar et al. |
| 6,647,269 | B2 | 11/2003 | Hendrey |
| 6,720,876 | B1 | 4/2004 | Burgess |
| 6,845,360 | B2 | 1/2005 | Jensen et al. |
| 6,934,508 | B2 | 8/2005 | Ceresoli et al. |
| 6,958,710 | B2 | 10/2005 | Zhang et al. |
| 6,970,786 | B2 * | 11/2005 | Hayama et al. ............. 701/209 |
| 7,006,982 | B2 * | 2/2006 | Sorensen .................... 705/10 |
| 7,012,565 | B2 * | 3/2006 | Park et al. .............. 342/357.12 |
| 7,015,817 | B2 * | 3/2006 | Copley et al. ............. 340/573.4 |
| 7,092,964 | B1 * | 8/2006 | Dougherty et al. ....... 707/104.1 |
| 2002/0097193 | A1 | 7/2002 | Powers |
| 2002/0107027 | A1 | 8/2002 | O'Neil |
| 2003/0005430 | A1 | 1/2003 | Kolessar |
| 2003/0055707 | A1 * | 3/2003 | Busche et al. ................. 705/10 |
| 2003/0097302 | A1 | 5/2003 | Overhultz et al. |
| 2003/0122708 | A1 | 7/2003 | Percy et al. |
| 2003/0170001 | A1 | 9/2003 | Breen |
| 2003/0171833 | A1 | 9/2003 | Crystal et al. |
| 2003/0171975 | A1 | 9/2003 | Kirshenbaum |
| 2004/0019675 | A1 | 1/2004 | Hebeler, Jr. et al. |
| 2004/0102961 | A1 | 5/2004 | Jensen et al. |
| 2004/0122727 | A1 | 6/2004 | Zhang et al. |
| 2004/0127192 | A1 | 7/2004 | Ceresoli |
| 2005/0035857 | A1 | 2/2005 | Zhang et al. |
| 2005/0159863 | A1 * | 7/2005 | Howard et al. ................. 701/37 |
| 2005/0201826 | A1 | 9/2005 | Zhang et al. |

OTHER PUBLICATIONS

Is a Next Generation Positioning Technology Necessary?; Matthew Rabinowitz, Ph.D.; James J. Spilker, Ph.D. Jun. 17, 2002; 22 pages total.

Various pages from Web site www.rosum.com; Rosum TV-GPS printed Feb. 16, 2005; 13 pages total.

* cited by examiner

FIGURE 3

| Commercial Establishment ID | Transmitter ID | Panelist ID | Time of Day | Duration |
|---|---|---|---|---|
| Ed's Emporium | 9562 | 1251 | 10:00 | <5 seconds |
| Ed's Emporium | 8723 | 1251 | 10:03 | 20 |
| Ed's Emporium | 2321 | 1251 | 10:04 | 30 |
| Ed's Emporium | 1950 | 1251 | 10:10 | 10 |
| Ed's Emporium | 7878 | 1251 | 10:13 | 30 |
| Ed's Emporium | 9562 | 1251 | 10:20 | <5 |

FIGURE 4
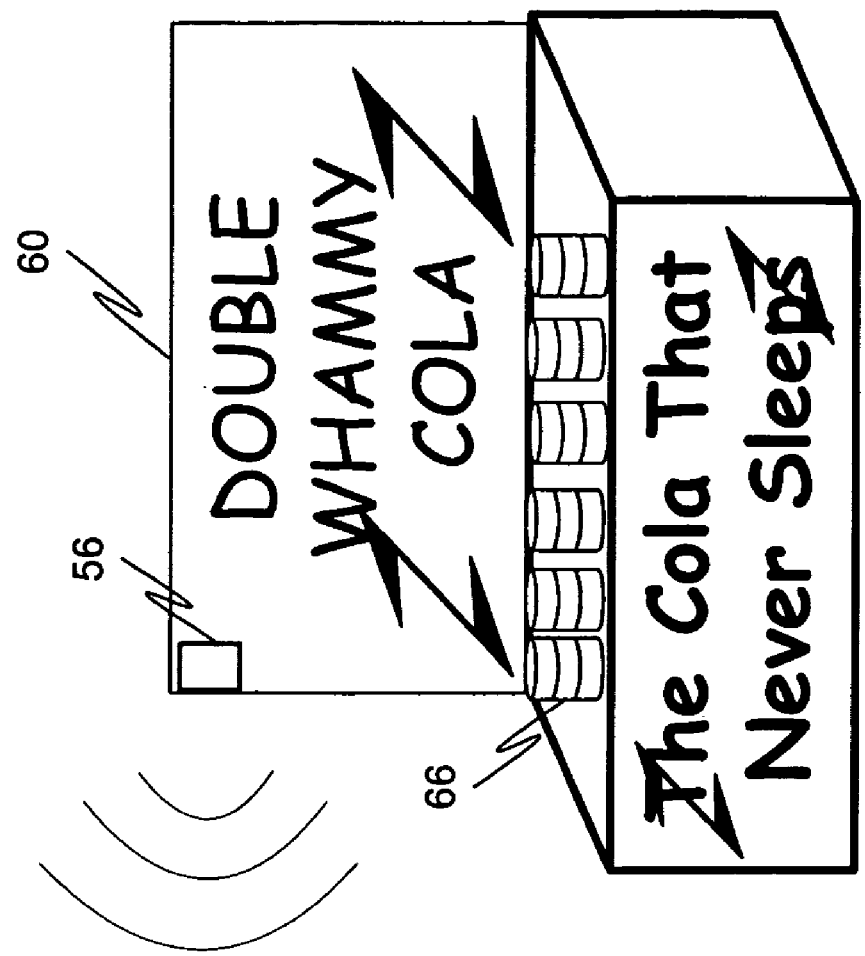
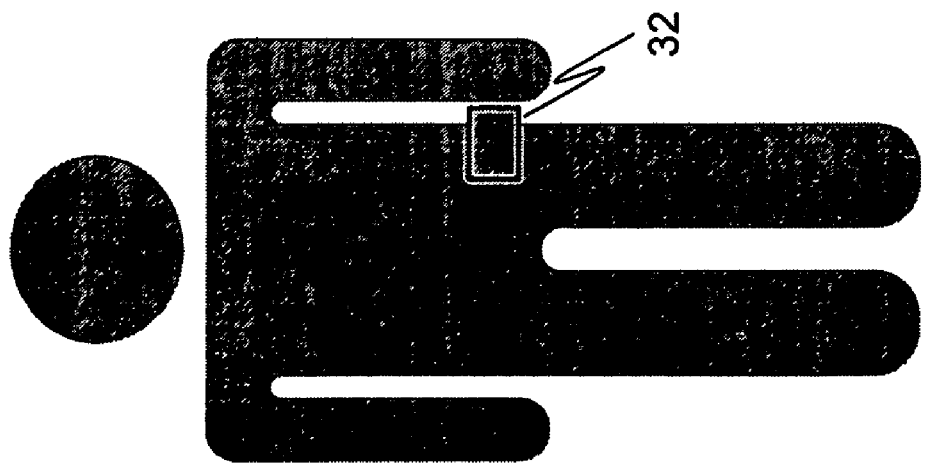

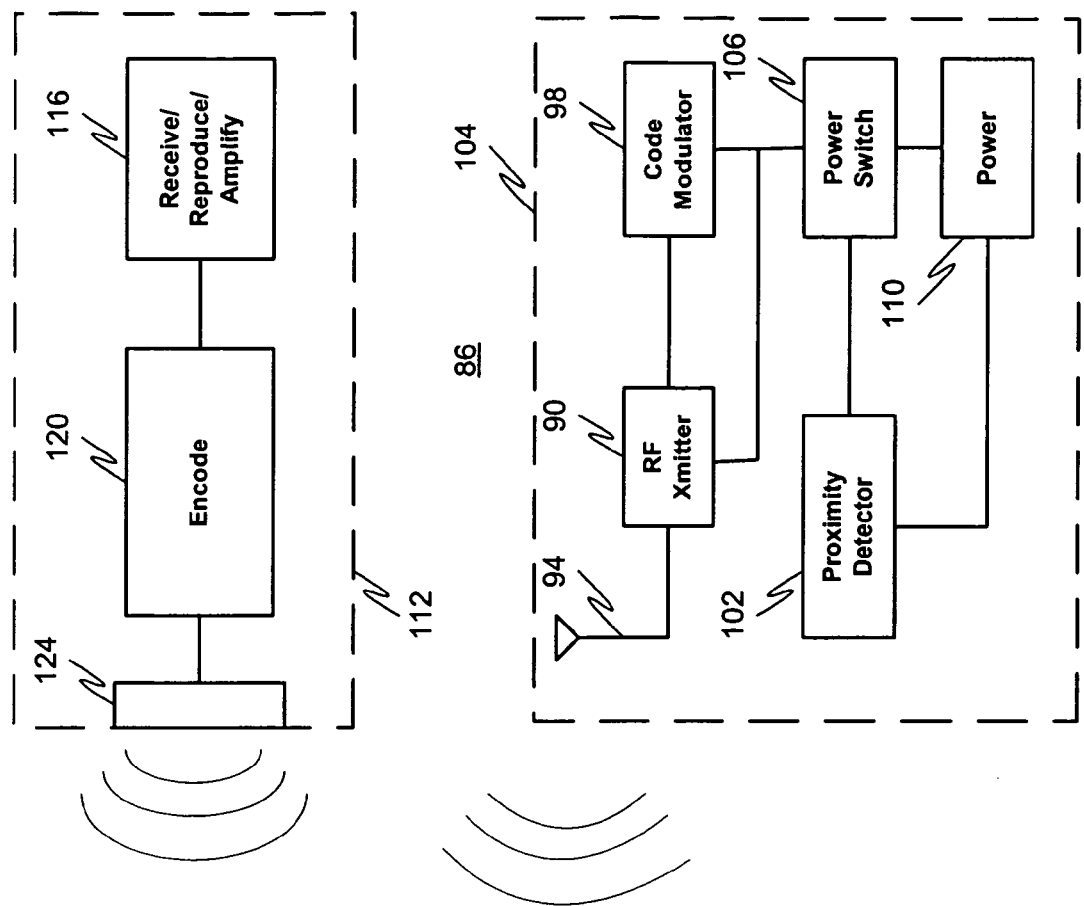
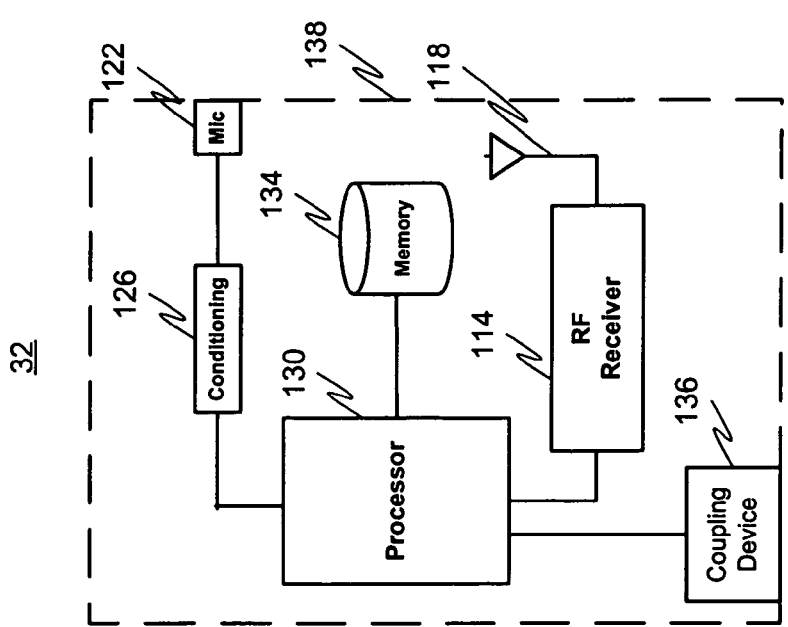
FIGURE 5

FIGURE 8

| Client | Store | In-Store Location | Transmitter ID | Product and/or Promotional Display | Distributor/ Manufacturer |
|---|---|---|---|---|---|
| Ed's Emporium | Bayville | E1 | 9562 | | |
| Ed's Emporium | Bayville | A1M | 8723 | Champ's Chomp Dog Food | Dog's Best Friend |
| Ed's Emporium | Bayville | A1B | 2321 | Double Whammy Cola | Zap! Distributors |
| Ed's Emporium | Bayville | A2F | 5584 | Glug Beer | F, L & H |
| Ed's Emporium | Bayville | A5F | 1950 | Grim Reaper Bug Spray | W&S |
| Ed's Emporium | Bayville | A6B | 7878 | 4 I's Reading Glasses | Optics-R-Us |
| Wilton Market | Wilton | E1 | 1973 | | |
| Wilton Market | Wilton | A1F | 1987 | Henri's Foi Gras | Swanky Frank's |
| Wilton Market | Wilton | A2B | 4527 | Acme Escargot | Snail's Pace |

FIGURE 12

| Venue-of-Interest | Time/Date |
|---|---|
| Store 260a | 10:00 02/25/2005 |
| Store 260b | 10:15 02/25/2005 |
| Store 260i | 10:50 02/25/2005 |
| Store 260e | 12:30 02/25/2005 |
| Store 260g | 13:20 02/25/2005 |

FIGURE 13

| Venue-of-Interest | Time/Date | Duration of Visit |
|---|---|---|
| Store 260a | 10:00 02/25/2005 | 13 minutes |
| Store 260b | 10:15 02/25/2005 | 25 minutes |
| Store 260i | 10:50 02/25/2005 | 60 minutes |
| Store 260e | 12:30 02/25/2005 | 40 minutes |
| Store 260h | 13:12 02/25/2005 | 0 |
| Store 260g | 13:20 02/25/2005 | 30 minutes |

FIGURE 14

| Venue-of-Interest | Time/Date | Duration of Visit | Duration of "Window Shopping" |
|---|---|---|---|
| Store 260a | 10:00 02/25/2005 | 13 minutes | 0 |
| Store 260b | 10:15 02/25/2005 | 25 minutes | 0 |
| Store 260i | 10:50 02/25/2005 | 60 minutes | 5 minutes |
| Store 260e | 12:30 02/25/2005 | 40 minutes | 0 |
| Store 260h | 13:12 02/25/2005 | 0 | 7 minutes |
| Store 260g | 13:20 02/25/2005 | 30 minutes | 0 |

| Venue-of-Interest | Time/Date |
|---|---|
| Advertisement 280b | 9:52 02/25/2005 |
| Advertisement 280a | 10:44 02/25/2005 |
| Advertisement 280f | 12:20 02/25/2005 |
| Advertisement 280d | 12:25 02/25/2005 |
| Advertisement 280e | 14:00 02/25/2005 |

| Venue-of-Interest | Time/Date | Direction of Travel |
|---|---|---|
| Advertisement 280b | 9:52 02/25/2005 | West |
| Advertisement 280a | 10:44 02/25/2005 | West |
| Advertisement 280f | 12:20 02/25/2005 | West |
| Advertisement 280d | 12:25 02/25/2005 | South |
| Advertisement 280e | 14:00 02/25/2005 | East |

| Venue-of-Interest | Time/Date | Duration inside Venue-of-Interest | Duration outside Venue-of-Interest |
|---|---|---|---|
| Advertisement 280b | 9:52 02/25/2005 | 0 | 0 |
| Store 260a | 10:00 02/25/2005 | 13 minutes | 0 |
| Store 260b | 10:15 02/25/2005 | 25 minutes | 0 |
| Advertisement 280a | 10:44 02/25/2005 | 0 | 0 |
| Store 260i | 10:50 02/25/2005 | 60 minutes | 5 minutes |
| Advertisement 280f | 12:20 02/25/2005 | 0 | 1 minute |
| Advertisement 280d | 12:25 02/25/2005 | 0 | 2 minutes |
| Store 260e | 12:30 02/25/2005 | 40 minutes | 0 |
| Store 260h | 13:12 02/25/2005 | 0 | 7 minutes |
| Store 260g | 13:20 02/25/2005 | 30 minutes | 0 |
| Advertisement 280e | 14:00 02/25/2005 | 0 | 0 |

| Mode Of Operation | Time of Day | Trigger Event |
|---|---|---|
| 1 | 9:00 | Mode 1 is initial mode of operation |
| 2 | 9:52 | Near Advertisement 280b |
| 1 | 9:53 | Not Near Point-of-Interest |
| 2 | 10:00 | Near Entrance of Store 260a |
| 1 | 10:01 | Lose GPS Signal (panelist within store 260a) |
| 2 | 10:13 | Recapture GPS Signal / Near Entrance of Store 260a |
| 1 | 10:13 | Not Near Point-of-Interest - Depart from Entrance of Store 260a |
| 2 | 10:15 | Near Entrance of Store 260b |
| 1 | 10:15 | Lose GPS Signal (panelist within store 260b) |
| 2 | 10:40 | Recapture GPS Signal / Near Entrance of Store 260b |
| 1 | 10:41 | Not Near Point-of-Interest - Depart from Entrance of Store 260b |
| 2 | 10:44 | Near Advertisement 280a |
| 1 | 10:44 | Not Near Point-of-Interest |
| 2 | 10:50 | Near Entrance of Store 260i |
| 1 | 10:51 | Lose GPS Signal (panelist within store 260i) |
| 2 | 11:50 | Recapture GPS Signal / Near Entrance of Store 260i |
| 1 | 11:55 | Not Near Point-of-Interest – Depart from Entrance of Store 260i |
| 2 | 12:20 | Near Advertisement 280f |
| 1 | 12:21 | Not Near Point-of-Interest |
| 2 | 12:25 | Near Advertisement 280d |
| 1 | 12:27 | Not Near Point-of-Interest |
| 2 | 12:30 | Near Entrance of Store 260e |
| 1 | 12:30 | Lose GPS Signal (panelist within store 260e) |
| 2 | 13:10 | Recapture GPS Signal / Near Entrance of Store 260e |
| 1 | 13:10 | Not Near Point-of-Interest |
| 2 | 13:12 | Near Entrance of Store 260h |
| 1 | 13:19 | Not Near Point-of-Interest |
| 2 | 13:20 | Near Entrance of Store 260g |
| 1 | 13:20 | Lose GPS Signal (panelist within store 260g) |
| 2 | 13:50 | Recapture GPS Signal / Near Entrance of Store 260g |
| 1 | 13:50 | Not Near Point-of-Interest |
| 2 | 14:00 | Near Advertisement 280e |
| 1 | 14:00 | Not Near Point-of-Interest |

| Venue-of-Interest | Location | Designated Distance (feet) |
|---|---|---|
| Store 260a | x1, y1 | 20 |
| Store 260b | x2, y2 | 20 |
| Store 260e | ⋮ | 40 |
| Store 260f | ⋮ | 40 |
| Store 260i | ⋮ | 60 |
| Advertisement 280a | ⋮ | 100 |
| Advertisement 280b | ⋮ | 100 |
| Advertisement 280c | ⋮ | 200 |
| Advertisement 280g | x9, y9 | 500 |

METHODS AND SYSTEMS FOR GATHERING MARKET RESEARCH DATA INSIDE AND OUTSIDE COMMERCIAL ESTABLISHMENTS

RELATED APPLICATION

This is a continuation-in-part of U.S. patent application Ser. No. 10/800,447, filed Mar. 15, 2004, assigned to the assignee of the present invention and hereby incorporated herein by reference in its entirety.

FIELD OF THE INVENTION

The present invention relates to market research methods and systems which gather data concerning the presence and/or proximity of panelists in or to various locations both inside and outside commercial establishments.

BACKGROUND OF THE INVENTION

Managers of commercial establishments, such as retail stores, shopping malls, transportation centers and the like, responsible for maximizing sales of products and services, are well aware that the layout of their facilities has a substantial impact on sales volume. To evaluate this impact, it is necessary to gather data characterizing the flow of customer traffic into and within the facility. This data will reveal the locations where customers are present more frequently ("hot spots") and those where customer traffic is lighter ("cold spots").

With this information, it is possible for the manager to make changes in features that affect accessibility, lighting, fixture space, product placement, and the like that will improve product exposure and reduce the number and/or size of cold spots. After such changes have been made, the manager will often wish to conduct a further traffic flow study to assess the effectiveness of these changes.

The tracking data, along with product placement data are also important to distributors of products sold in commercial establishments. This information enables them to evaluate whether their products are receiving sufficient attention in a commercial establishment, so that the cost of shelf space, among other things, is justified. It also enables them to assess whether they should request shelf space for their products in a different location in the commercial establishment. Tracking data also enables distributors and other entities to better understand particularly how customers shop within commercial establishments, and also may be used to better understand operations and activities of competitive businesses.

Traditionally such traffic flow studies have been conducted manually. One or more of the manager's employees would record the movements of customers within the facility on a sheet representing its layout. The accumulated data would then be reviewed by the manager. Clearly, this is a labor-intensive way of gathering such data. It is also potentially annoying to customers if the employees tracking them are not very discrete. Traffic flow also is assessed utilizing electronic or mechanical methods, such as by the use of turn-styles, electronic beams and other known techniques. However, these "people counters" are of limited value since they generally only ascertain the number of people passing a specific location without regard to the identities or demographics of those people. Employees, and sometimes non-humans, such as pets, passing by such counters also are included in the data. Sales or purchasing data (e.g., via frequent shopper type cards) also may be utilized to estimate traffic flow.

In addition to in-store traffic flow studies and measures, owners, managers, distributors, etc., of commercial establishments are further interested in tracking retail customers' other patterns of movements, such as customers' travel and store visiting patterns prior to entry and after exiting such commercial establishments. This information enables them to assess, among other things, which stores represent their greatest competition. Current studies employ surveys and shopping diaries that require customers to manually record their travel patterns, identifying the stores they visited and for how long. Similar to the above-mentioned manually performed in-store traffic flow studies, surveys and shopping diaries are also labor-intensive and are generally not popular. Many consumers find it difficult to complete surveys and shopping diaries, often making omissions or over-statements when recording their activity and travel patterns.

It is desired, therefore, to provide less expensive, less labor-intensive and less potentially annoying ways to gather in-store and out-of-store traffic flow data. In addition, owners and managers of commercial establishments as well as manufacturers and distributors would like to obtain reports from which they can evaluate the effectiveness of their advertising expenditures, based not only on such traffic flow data but also on media exposure data and the like. Such reports would in turn enable retailers to better understand the shopping characteristics and habits of customers in ways previously not possible.

SUMMARY OF THE INVENTION

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, text, images, animations, databases, datasets, broadcasts, displays, signs, signals, web pages and streaming media data.

The term "database" as used herein means an organized body of related data, regardless of the manner in which the data or the organized body thereof is represented. For example, the organized body of related data may be in the form of a table, a map, a grid, a packet, a datagram, a file, a document, a list or in any other form.

The term "location" as used herein refers to a position relative to a commercial establishment, a product display, a product, another object or facility, or relative to a coordinate system such as latitude and longitude.

The term "layout map" as used herein means a database of data representing locations in a commercial establishment.

The term "network" as used herein includes both networks and internetworks of all kinds, including the Internet, and is not limited to any particular network or inter-network.

The terms "first" and "second" are used to distinguish one element, set, data, object, step, process, activity or thing from another, and are not used to designate relative position or arrangement in time, unless otherwise stated explicitly.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The terms "communicate," "communicating" and "communication" as used herein include both conveying data from a source to a destination, and delivering data to a communications medium, system, device or link to be conveyed to a destination.

The term "processor" as used herein means processing devices, apparatus, programs, circuits, components, systems and subsystems, whether implemented in hardware, software or both.

The terms "storage," "data storage" and "memory" as used herein mean data storage devices, apparatus, programs, circuits, systems, subsystems and storage media serving to retain data, whether on a temporary or permanent basis, and to provide such retained data.

The terms "panelist," "respondent" and "participant" are interchangeably used herein to refer to a person who is, knowingly or unknowingly, participating in a study to gather information, whether by electronic, survey or other means, about that person's behavior or activity or exposure to media.

The term "commercial establishment" as used herein means a physical facility or designated location, whether permanent or temporary in nature, and includes but is not limited to a building, a kiosk, a tent, a booth, a table, place, venue or area where goods, services and/or performances are sold, licensed, rendered, distributed or provided. Exemplary commercial establishments are retail stores, service stations, sports arenas, concert halls, movie theatres, educational facilities, government facilities, community events (e.g., fairs), office buildings, places of business (e.g., medical office) within office buildings, a musical performance (e.g., in an outdoor park), etc.

The term "in-store" as used herein means located within a commercial establishment and the term "out-of-store" as used herein means not located within a commercial establishment.

The term "venue of interest" as used herein means a commercial establishment or other physical location or venue about which information is desired. In addition to commercial establishments, a venue of interest may include, but is not limited to, an outdoor advertisement (e.g., a billboard) or an interior advertisement, whether visible from locations outside or inside commercial establishments (e.g., a "window" display, an interior display). A venue of interest may include a location at which non-visible advertisements or other non-visible information perceivable by a human or by a device accompanying a human (e.g., carried by a human, attached to a motor vehicle used by a human).

The term "location" as used herein refers to a position relative to a commercial establishment, a product display, a product, another object or facility, or relative to a coordinate system such as latitude and longitude.

The term "position signal" as used herein means a signal from which a position can be derived, either in absolute or relative terms, with or without the use of additional position signals.

In accordance with an aspect of the present invention, a portable monitor is provided for use in a market research study for monitoring travel and commercial establishment visiting patterns of participants in the market research study. The portable monitor comprises a wireless receiver operative to receive one or more position signals and to supply position data corresponding to the one or more position signals; storage operative to store venue of interest data representing locations of venues of interest pertinent to the market research study; and a processor operative to process the position data to ascertain a current location of the participant carrying the portable monitor, to assess whether the participant carrying the portable monitor is within a predetermined proximity to at least one of the venues of interest based upon the ascertained current location of the participant and the venue of interest data stored in the storage, and to generate, when the processor assesses that the participant is within the predetermined proximity to said at least one of the venues of interest, a record including data representative of the respective venue of interest and time data representative of a time at which the participant is within the predetermined proximity to the respective venue of interest.

In accordance with a further aspect of the present invention, a method is provided for monitoring travel and retail establishment visiting patterns of participants in a market research study. The method comprises providing a portable monitor to each of a plurality of participants in the market research study, the portable monitor adapted to be carried on the person of one of the participants, containing a wireless receiver operative to receive one or more position signals, and containing a storage operative to store venue of interest data representing locations of venues of interest pertinent to the market research study; ascertaining a current location of the portable monitor based upon the received one or more position signals; assessing whether the portable monitor is within a predetermined proximity to at least one of the venues of interest represented by the venue of interest data; and generating a record including data representative of the respective venue of interest to which the portable monitor is disposed within the predetermined proximity and time data representative of a time when the portable monitor is assessed to be disposed within the predetermined proximity of the respective venue of interest.

In accordance with another aspect of the present invention, a portable monitor is provided for use in a market research study for monitoring retail establishment visiting patterns of participants in the market research study. The portable monitor comprises a wireless receiver operative to receive one or more position signals and to supply position data corresponding to the one or more position signals; and a processor operative to process the position data to ascertain a current location of the portable monitor, to assess whether the portable monitor is within a predetermined proximity to at least one of a plurality of retail establishments pertinent to the market research study, and to generate a record of a visit to the retail establishment if the wireless receiver is unable to receive position signals sufficient to enable the processor to ascertain the current location of the portable monitor after the processor assesses that the portable monitor is within the predetermined proximity to the retail establishment, the generated record including data representative of the retail establishment and time data representing a time the portable monitor entered the retail establishment.

In accordance with still a further aspect of the present invention, a portable monitor is provided for use in a market research study for monitoring travel and retail establishment visiting patterns of participants in the market research study. The portable monitor comprises a wireless receiver operatively controlled to receive one or more position signals and to supply position data corresponding to the one or more position signals; storage operative to store venue of interest data representing locations of venues of interest pertinent to the market research study; and a processor operative to control the wireless receiver to receive said one or more position signals at a first rate in a first mode of operation, and to control the wireless receiver to receive said one or more position signals at a second rate in a second mode of operation, the second rate being substantially higher than the first rate, to process the position data to ascertain a current location of the portable monitor, to assess whether the portable monitor is within a predetermined proximity to at least one of the venues of interest based upon the ascertained current location of the portable monitor and the venue of interest data, and to generate, when the processor assesses that the portable monitor is within the predetermined proximity to at least one of the venues of interest, a record including data representative of the respective venue of interest to which the portable monitor is within the predetermined proximity and time data representative of a time when the portable monitor is within the predetermined proximity to the respective venue of interest.

In accordance with yet another aspect of the present invention, a method is provided for monitoring travel and retail establishment visiting patterns of participants in a market research study. The method comprises providing a portable monitor to each of a plurality of participants in the market research study, the portable monitor adapted to be carried on the person of one of the participants, and containing a wireless receiver operative to receive one or more position signals, and containing a storage operative to store venue of interest data representing locations of venues of interest pertinent to the market research study; selecting a rate of operation of the wireless receiver, the rate being selected from at least one of a first rate and a second rate, the second rate being substantially higher than the first rate; receiving by the wireless receiver one or more position signals at the selected rate of operation, ascertaining a current location of the portable monitor based upon the received one or more position signals; assessing whether the ascertained current location is within a predetermined proximity to at least one of the venues of interest represented by the venue of interest data; and generating a record including data representative of the respective venue of interest that the portable monitor is assessed to be within the predetermined proximity and time data representative of a time at which the portable monitor is within the predetermined proximity to the respective venue of interest.

In accordance with an additional aspect of the present invention, a portable monitor is provided for use in a market research study for monitoring retail establishment visiting patterns of participants in the market research study. The portable monitor comprises a first wireless receiver operative to receive one or more position signals of a first type and to supply first position data corresponding to the one or more position signals of the first type; a second wireless receiver operative to receive one or more position signals of a second type and to supply second position data corresponding to the one or more position signals of the second type; and a processor operative to process the first position data to ascertain a current location of the portable monitor, to assess whether the portable monitor is within a predetermined proximity to at least one of a plurality of retail establishments pertinent to the market research study, to generate a record of a visit to the retail establishment if the first wireless receiver is unable to supply first position data sufficient to enable the processor to ascertain the current location of the portable monitor after the processor assesses that the portable monitor is within the predetermined proximity to the retail establishment, and to track movement of the portable monitor in accordance with the second position data if the first wireless receiver is unable to supply first position data sufficient to enable the processor to ascertain the current location of the portable monitor.

In accordance with yet another aspect of the present invention, a method is provided for monitoring travel and retail establishment visiting patterns of participants in a market research study. The method comprises providing a portable monitor to each of a plurality of participants in the market research study, the portable monitor adapted to be carried on the person of one of the participants, the portable monitor containing a first wireless receiver operative to receive one or more position signals of a first type, and a second wireless receiver operative to receive one or more position signals of a second type. The method further comprises receiving by the first wireless receiver one or more position signals of the first type; ascertaining a current location of the portable monitor based upon the received one or more position signals of the first type; assessing whether the portable monitor is within a predetermined proximity to at least one of a plurality of retail establishments pertinent to the market research study; generating a record of a visit to the retail establishment if, after assessing that the portable monitor is within the predetermined proximity to the retail establishment, the first wireless receiver in the portable monitor is unable to receive one or more position signals of the first type sufficient for the assessing step to ascertain the current location of the portable monitor; receiving by the second wireless receiver one or more position signals of the second type when the first wireless receiver in the portable monitor is unable to receive one or more position signals of the first type sufficient for the assessing step to ascertain the current location of the portable monitor; and tracking movement of the portable monitor in accordance with the one or more position signals of the second type received by the second wireless receiver.

In accordance with still yet a further aspect of the present invention, a portable monitor is provided for use in a market research study for monitoring travel patterns of participants in the market research study. The portable monitor comprises a wireless receiver operative to receive one or more position signals and to supply position data corresponding to the one or more position signals, storage operative to store venue of interest data pertaining to venues of interest pertinent to the market research study, each venue of interest representing a visually viewable advertisement, the venue of interest data including for at least selected ones of each venue of interest physical attribute data identifying a physical attribute of the visually viewable advertisement represented by the respective venue of interest; a processor operative to process the position data to ascertain a current location of the portable monitor, to ascertain a portable monitor movement characteristic pertaining to movement of the portable monitor, to assess whether the portable monitor is within a predetermined proximity to one of the venues of interest, to determine whether the ascertained portable monitor movement characteristic corresponds to the physical attribute data of said one of the venues of interest, and to generate, when the ascertained portable monitor movement characteristic corresponds to the physical attribute data of said one of the venues of interest, a record including data representative of the respective venue of interest and time data representative of a time at which the portable monitor is within the predetermined proximity to the respective venue of interest.

In accordance with still yet another aspect of the present invention, a method is provided for monitoring travel patterns of participants in a market research study. The method comprises providing a portable monitor to each of a plurality of participants in the market research study, the portable monitor adapted to be carried on the person of one of the participants, and containing a wireless receiver operative to receive one or more position signals, and containing a storage operative to store venue of interest data pertaining to venues of interest pertinent to the market research study, each venue of interest representing a visually viewable advertisement, the venue of interest data including for at least selected ones of each venue of interest physical attribute data identifying a physical attribute of the visually viewable advertisement represented by the respective venue of interest; ascertaining a current location of the portable monitor based upon the received one or more position signals; assessing whether the portable monitor is within a predetermined proximity to at least one of the venues of interest represented by the venue of interest data; ascertaining a portable monitor movement characteristic pertaining to movement of the portable monitor; determining whether the ascertained portable monitor movement characteristic corresponds to the physical attribute data of said one of the venues of interest, and generating, when the ascertained portable monitor movement characteristic corresponds to the physical attribute data of said one of the venues of interest, a record including data representative of the respective venue of interest and time data representative of a time at which the portable monitor is within the predetermined proximity to the respective venue of interest.

BRIEF DESCRIPTION OF THE DRAWINGS

FIG. 3 illustrates a table of a database in accordance with certain embodiments of the present invention;

FIG. 4 illustrates a method and system for measuring exposure of a panelist participating in a consumer behavior study to a promotional display in accordance with certain embodiments of the present invention;

FIG. 5 provides block diagrams of certain embodiments of signal transmitters and a portable monitor arranged to be carried on the person of a panelist participating in a consumer behavior study, in accordance with certain embodiments of the present invention;

FIG. 8 illustrates a further table of the database including the table of FIG. 3 in accordance with certain embodiments of the present invention;

FIG. 12 illustrates a table containing a record of venues of interest visited by a panelist in accordance with certain embodiments of the present invention;

FIG. 13 illustrates a table containing a record of venues of interest visited by a panelist in accordance with further embodiments of the present invention;

FIG. 14 illustrates a table containing a record of venues of interest visited by a panelist in accordance with additional embodiments of the present invention;

FIG. 15 illustrates a table containing a record of venues of interest visited by a panelist in accordance with yet other embodiments of the present invention;

FIG. 16 illustrates a table containing a record of venues of interest visited by a panelist in accordance with yet further embodiments of the present invention;

FIG. 17 illustrates a table containing a record of venues of interest visited by a panelist in accordance with yet additional embodiments of the present invention;

FIG. 18 illustrates a table showing modes of operation by the portable monitor during use in accordance with certain embodiments of the present invention;

FIG. 19 illustrates a table showing venues of interest stored in the portable monitor in accordance with certain embodiments of the present invention;

DETAILED DESCRIPTION OF CERTAIN ADVANTAGEOUS EMBODIMENTS

The present invention is useful for monitoring the presence and/or movements of panelists, participants in panel studies, in all manners within and outside commercial establishments. Certain embodiments described herein are particularly useful for gathering data within commercial establishments for carrying out internal traffic flow studies and/or exposure to advertising and promotional activities. Certain embodiments are particularly useful for gathering data outside commercial establishments, including outdoor travel patterns and/or outdoor advertising and media exposure. Yet other embodiments are capable of gathering data about travel patterns, as well as media exposure, both inside and outside retail establishments.

In the various embodiments described, panelists participating in one or more market research studies carry portable monitors designed to implement various functions and gather various information, as herein described. The various embodiments described enable single source gathering of information relevant to commercial establishment visiting patterns, in-store travel patterns, out-of-store travel patterns, and advertisement exposure, among other things. This information, along with obtaining the demographics of the participating panelists, represents immeasurably useful information for assessment by market research companies and others.

Figure 1:
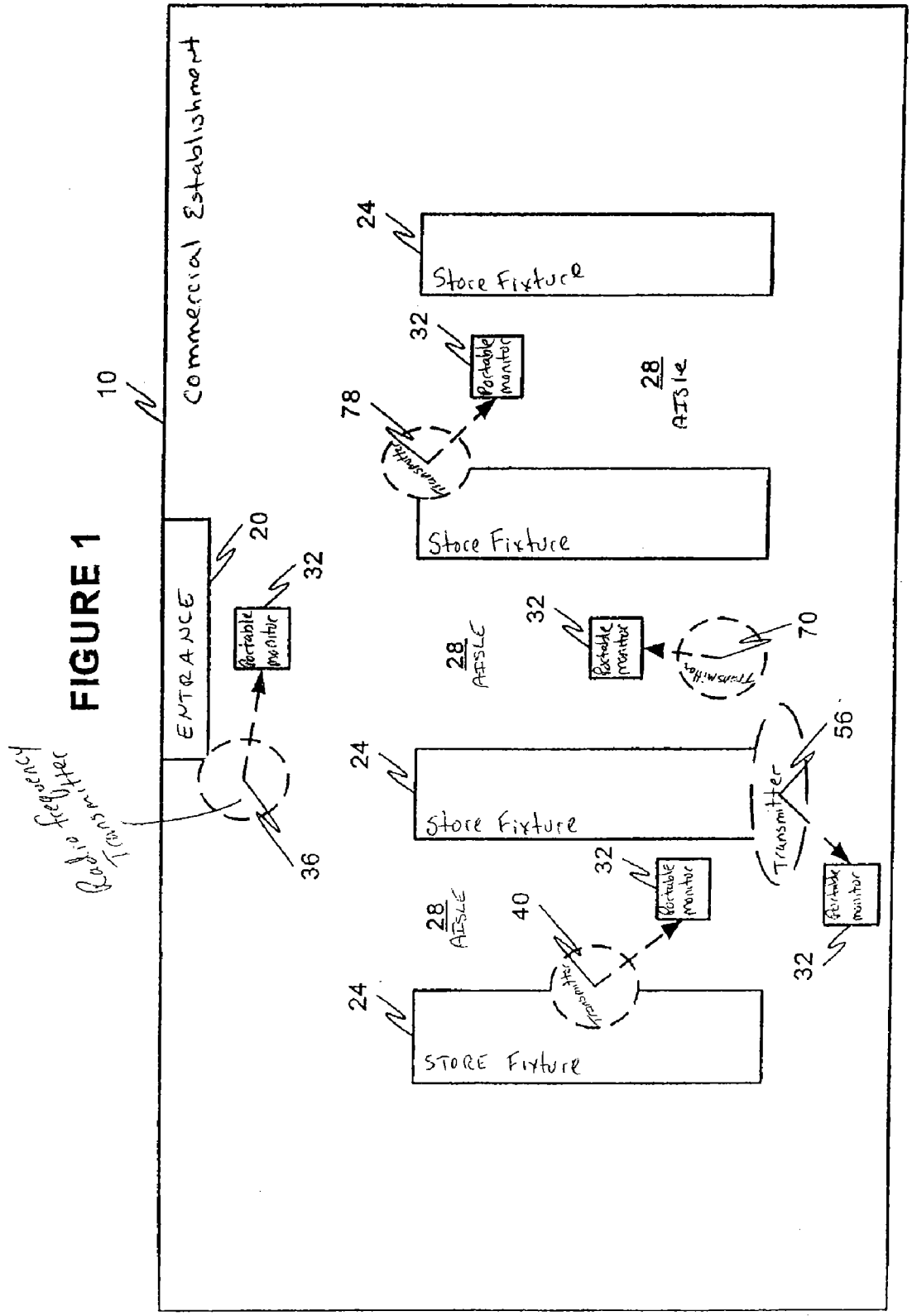
FIG. 1 is a schematic diagram of a floor of an exemplary commercial establishment for use in illustrating certain embodiments of the present invention.

Referring now to the drawings, FIG. 1 schematically illustrates a floor of an exemplary commercial establishment 10 having an entrance 20 and a plurality of fixtures 24 comprising shelving for products offered for sale. The fixtures 24 define aisles 28 therebetween.

A portable monitor 32 is carried on the person of a panelist participating in a market research study to track the presence and movements of the panelist into and within the commercial establishment, as well as other such commercial establishments and/or other commercial establishments participating in the study. As depicted in FIG. 1, when the panelist enters the commercial establishment at the entrance 20, the portable monitor 32 carried by the panelist receives a location signal from a radio frequency (RF) transmitter 36 positioned in proximity to the entrance 20. The frequency or frequencies of the location signal can be selected from any permissible frequency range, up to and including microwave frequencies.

The location signal contains data from which the presence of the panelist at the entrance can be determined. Such data in certain embodiments comprises a transmitter identification code that uniquely identifies the transmitter 36. In certain embodiments a commercial establishment identification code is transmitted by the transmitter, along with the transmitter identification code. This transmitter identification code, and commercial establishment identification code, if any, are stored in a database where this data is associated with data identifying the location of the transmitter at the entrance to the commercial establishment. In other embodiments, the location signal contains data that either directly or indirectly identifies the location. In still other embodiments, as described hereinbelow, a commercial establishment identification code is supplied to the monitor 32 for storage therein from another source, such as a separate wireless transmitter.

The strength of the transmitted location signal, along with the sensitivity of the monitor 32 are selected to ensure that monitor 32 will only detect the data contained in the location signal when it is sufficiently near the identified location for the purposes of the study. In certain advantageous embodiments, one or both of the strength of the location signal and the sensitivity of the monitor are selected to ensure that the monitor 32 will only detect the data in the location signal when the monitor is located within a predetermined area to be monitored, such as a predetermined area in which a particular product or product display can be perceived by the panelist. When the monitor 32 detects the data contained in the location signal, it stores either the data or data based thereon, together with a time stamp indicating the time at which the data was received.

Figure 2:
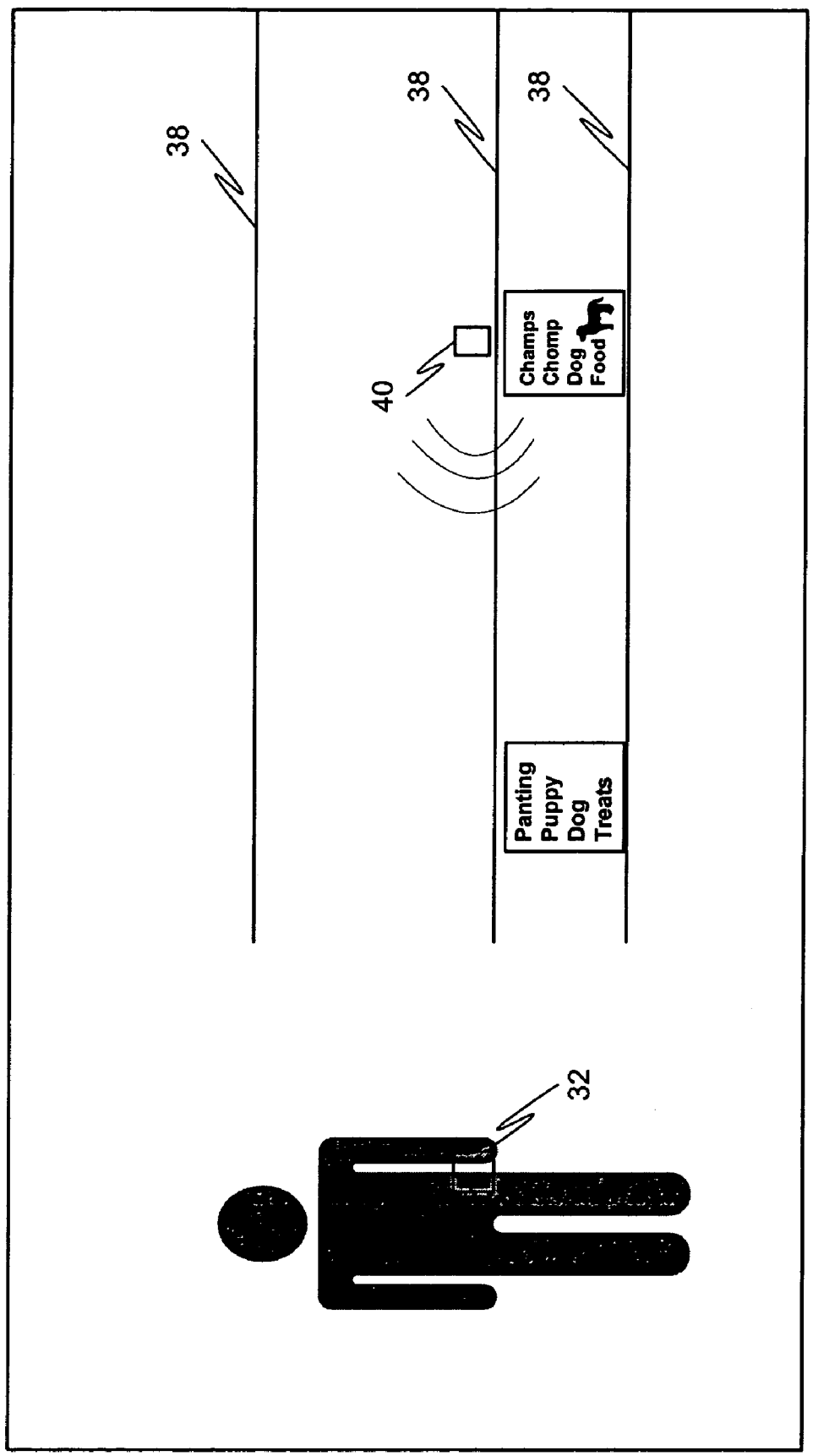
FIG. 2 is a schematic diagram of an aisle of the commercial establishment of FIG. 1.

With reference also to FIG. 2, after the panelist has entered the retail establishment and then proceeds down an aisle flanked by shelves 38 holding various products offered for sale, the panelist comes into the range of a transmitter 40. The portable monitor 32 carried by the panelist then detects the data contained in a further location signal from the transmitter 40, and stores it along with a time stamp indicating the time of detection of the further location signal. With reference particularly to FIG. 2, it will be seen that the transmitter 40 has been placed in the vicinity of a particular product offered for sale, here indicated as a fictitious product, Champs Chomp dog food. If the portable monitor 32 contains data indicating that the panelist was continuously located for an extended period of time (e.g., 1 minute, 2 minutes, etc.) in the vicinity of transmitter 40, this indicates that the panelist may be interested in purchasing the adjacent product.

Accordingly, continuously, periodically or from time to time the monitor 32 checks for the detection of the data contained in the same or a different location signal. If the data of the further location signal has again been detected, the monitor 32 stores further data indicating a duration of the continuous presence of the panelist in the vicinity of transmitter 40.

FIG. 3 illustrates an embodiment of a table storing the location data and commercial establishment identification data detected by the monitor 32 from various location signals, together with time (and date) stamps indicating a time (and date) of detection of the data and the duration of continuous detection of the same data (date not shown in FIG. 3 for purposes of simplicity). In the exemplary table of FIG. 3, each row represents a record of the detection of the data from a respective transmitter, here represented as a transmitter ID, along with a monitor ID (which corresponds to the panelist to whom the particular monitor has been assigned), the time at which the data from that transmitter was first detected and a duration of continuous detection of the data from such transmitter. In an alternative embodiment, duration data is not recorded, but rather the first and last instances the transmitter is detected continuously is recorded. In yet another alternative embodiment, each instance is recorded. In certain embodiments, the data detected by the monitor is stored without the monitor ID which is not associated with the other stored data until it has been downloaded from the monitor 32.

A first record 44 of the FIG. 3 table is an example of the data stored by portable monitor 32 upon detection of the data contained in a location signal received from transmitter 36 when the panelist enters the commercial establishment through entrance 20. In the embodiment of FIG. 3, each transmitter transmits a signal containing location data as well as commercial establishment data (here indicated as a fictitious commercial establishment, Ed's Emporium). In other embodiments, separate transmitters transmit commercial establishment data. In certain embodiments, the commercial establishment data directly identifies the commercial establishment, while in others the commercial establishment data is used to access or derive such identity. In certain embodiments, the commercial establishment data relates to the commercial establishment, with or without identifying it directly or indirectly. In certain embodiments, the identity of the commercial establishment in which a location signal transmitter is located is determined based solely on previously stored data associating a transmitter ID with the commercial establishment or other establishment in which it is located. Returning to record 44 of FIG. 3, the recorded duration of this detection is indicated to be less than 5 seconds. A second record 48 stores data detected by monitor 32 in the vicinity of transmitter 40. Here the record indicates that the panelist remained for 20 seconds indicating interest in Champs Chomp dog food in Ed's Emporium.

A further record 52 of the FIG. 3 table represents data gathered by the monitor as the panelist pauses in the vicinity of a transmitter 56 shown in FIG. 1 near the end of a store fixture 24. FIG. 4 illustrates the transmitter 56 mounted on an in-store product display 60 for a fictitious soft drink product, Double Whammy cola. As shown in FIG. 4, the product display 60 serves to attract attention to the product 66 which it carries or contains. As the panelist stops by the product display 60, the monitor records data indicating the duration of the panelist's presence near the product display providing an indication of its effectiveness in attracting consumer attention.

With reference again to FIG. 1, as the panelist proceeds down another aisle, the monitor 32 detects data contained in a location signal from a transmitter 70 placed above the aisle to estimate the amount of traffic therethrough to detect whether the aisle is a "cold spot" or a "hot spot" in the commercial establishment. The detected data is stored by the monitor 32 in a record such as exemplary record 74 shown in FIG. 3.

Still later the panelist pauses in the vicinity of another transmitter 78 to examine a product, as indicated by record 82 in FIG. 3. Shortly thereafter, the panelist proceeds to the commercial establishment's checkout counter (not shown for purposes of simplicity and clarity) to pay for the selected products, and then leaves the commercial establishment as indicated by record 86 in FIG. 3.

In certain embodiments described herein, the transmitters described herein may be direction specific, that is, the direction of travel of a panelist carrying monitor 32 relative to visible sides of a display or product (or other item) associated with the transmitter is ascertainable. Certain displays and products may be (and often are) viewable at limited locations near such display or product. For example, an advertisement (first advertisement) disposed on one side of a display (e.g., structure hanging from the ceiling) is viewable only from positions facing that side of the display. A second advertisement (or no advertisement) may be disposed on the opposite side of that same display. A panelist traveling along the aisle in one direction would see the first advertisement, but not the second. Another panelist traveling in that aisle in the opposite direction would see the second advertisement, but not the first. In accordance with certain embodiments, the transmitters transmit signals in one direction so that the viewable direction of the advertisement or product display is ascertainable. In certain embodiments, a signal is transmitted with the use of reflectors or other techniques so that the signal is stronger in one direction than another, so that viewable directional information is ascertainable by monitor 32. In other embodiments, a second signal is transmitted to enable detection of directional information. The second signal may be an RF signal, an infra-red signal or other suitable signal.

In various embodiments described with regard to direction specific transmitted signals, data stored within monitor 32 includes signal characteristics so that assessment of the stored data enables the determination of whether a display or product associated with a transmitter has been (or has been likely to have been) seen by the panelist carrying the monitor. For example, the table in FIG. 3 may also include for each record stored an indication of how a received signal had changed (if there was a pertinent change) and at what time the change occurred. In the above example where a first advertisement is displayed only on one side of a display, a record stored in monitor 32 may contain, for example, a duration of 10 seconds where a transition from detection of a strong signal to detection of a weak signal occurred at second 5 of the 10 second duration of detection. If the strong signal is receivable at locations in front of the advertisement (i.e., where it can be seen), then from the stored record it can be inferred that there was a high likelihood that the advertisement was seen by the panelist. On the other hand, if the record indicated a transition from a weak signal to a strong signal, it is likely that that the advertisement was not seen. Although it is still possible for the panelist to turn around to view the advertisement during the panelist's travels along the aisle, highly useful information is gleaned from the data gathered.

FIG. 5 provides a block diagram of certain embodiments of the portable monitor 32, along with a block diagram 86 of certain embodiments of the transmitters 36, 40, 56, 70 and 78. In the diagram 86, an RF transmitter 90, antenna 94, code modulator 98, proximity detector 102, power switch 106 and power source 110 are enclosed or carried within a container 104. The container 104 preferably is small and otherwise inconspicuous, so that it is unnoticed by panelists and thus does not influence their behavior. In certain embodiments, the transmitters are contained in a thin laminated package that can be affixed inconspicuously to the bottom of a shelf. In others they are carried in a small housing or encapsulated in molded plastic.

In the transmitter embodiment 86, power from the power source 110 is only applied to the RF transmitter 90 and code modulator 98 when the proximity detector 102 detects the presence of a person in proximity to the transmitter 86 and turns on the normally off power switch 106. The proximity detector 102 senses a selected form or forms of data indicating the presence or approach of a person, such as changes or levels of infrared, thermal, light, microwaves, radio frequencies, other forms of electrical energy, or other detectable manner and then provides a switching signal to power switch 106 to turn it on. In certain embodiments an external switch is employed to switch on power, such as a pressure sensitive switch activated by the panelist's footstep or a doorway switch actuated by opening a door or passing through a doorway. Preferably power switch 106 remains on only long enough to ensure that a detectable location signal is transmitted to any monitor 32 that may be carried by a panelist nearby, so that power from the source 110 is conserved to ensure the continuing ability of the transmitter 86 to function. As an example only, in certain embodiments the power switch applies power continuously for 30 seconds after receipt of the switching signal and then automatically resets to an off state, so that the location signal is transmitted continuously for such 30 second period. In certain embodiments, the transmitter has two operational states, a standby, low power mode in which it does not transmit and a transmit mode in which it does. In such embodiments, the switch 106 or other circuitry switches the transmitter from the standby mode to the transmit mode when a person's proximity is detected. In certain other embodiments, switch 106 is a manually activated switch, such as a push-button or a coupon removal activated switch or other appropriate device.

The RF transmitter 90 drives antenna 94 to transmit an RF location signal within an appropriate band selected as any permissible RF band up to and including microwave frequencies. In certain embodiments the RF transmitter 90 produces the location signal in an unlicensed 900 MHz band and at a sufficiently low power level so that its data will be detectable by monitor 32 only within a relatively short range.

The data contained by the location signal is produced by code modulator 98 and applied as a modulating signal by code modulator 98 to RF transmitter 90. In certain embodiments, the data represents an identification of the transmitter itself, while in others it directly represents the location of the transmitter 86 or commercial establishment. The location signal can be modulated in any manner that is compatible with the detection capabilities of portable monitor 32, such as by amplitude, frequency, pulse or phase modulation or any combination thereof. In certain embodiments the data is simply represented by the frequency of the location signal, so that a separate code modulator is not required. In certain embodiments, the data modulates the location signal to produce a periodically repeating code. As an example, such a code could repeat every 10 seconds during the transmission of the location signal, although a different repetition rate could be selected depending on the amount of data that must be transmitted and the detection error rate of the personal monitor 32 within the desired detection area.

The power source 110 is selected as one that is capable of supplying sufficient power for a desired duration, such as the duration of the marketing study. The power source 110 in certain embodiments is selected as a rechargeable battery, a non-rechargeable battery, an energy storage device, a photoelectric power source and/or a different energy receiving device such as an antenna receiving energy from the portable monitor 32 or other external source.

In certain embodiments rather than transmit upon detection of a person in proximity to the transmitter 86, the RF transmitter 90 transmits the location signal periodically. In still other embodiments the RF transmitter 90 transmits the location signal in response to a query signal transmitted from a transmitter included in the portable monitor 32 (not shown for purposes of simplicity and clarity). In certain embodiments, the transmitter is an RFID tag that receives a read signal from the monitor 32, and uses the energy of the received read signal to encode its data and retransmit the encoded data as a location signal. In embodiments which employ such RFID tags, it is advantageous to selectively key the monitor or to transmit such read signal as infrequently as possible, due to the relatively large amount of energy that must be transmitted by the monitor 32 to energize the RFID tag to retransmit a detectable location signal. For this purpose, in certain embodiments a transmitter is provided in or near the commercial establishment to key the monitor to transmit the read signal.

In certain embodiments, one or more RF energy emitters separate from the monitors 32 are placed in or near the commercial establishment to emit RF energy to be received by one or more nearby RFID tags in order to energize them to transmit their codes. When a panelist carrying a monitor 32 comes within range of one of such RFID tags, the monitor detects its code and stores appropriate data. In certain embodiments, the RF energy emitters emit RF energy continuously. In others, the RF energy emitters emit RF energy periodically, from time to time, at certain times or during certain time periods. In still other embodiments, the RF energy emitters emit RF energy upon detecting either a presence of a person or of a monitor 32.

In other embodiments in place of an RF transmitter 90, the transmitter 86 employs a different type of wireless transmitter, such as an infrared, visible light or acoustic transmitter. An appropriate acoustic location code emitter for this purpose is disclosed in U.S. published patent application 20030171833 A1 in the names of Jack C. Crystal and James M. Jensen, assigned to the assignee of the present application and hereby incorporated in its entirety herein by reference.

FIG. 5 also provides a block diagram of an embodiment of the portable monitor 32 which includes an RF receiver 114, an antenna 118, a microphone 122, conditioning circuitry 126, a processor 130, a storage 134, a coupling device 136 and an enclosure 138 containing all of the foregoing elements of portable monitor 32. The enclosure preferably is sufficiently small to permit the portable monitor 32 to be carried in or on an article of clothing worn by the panelist, such as a belt, pocket, collar or lapel, or on the panelist's wrist or elsewhere. In certain embodiments the enclosure 138 is provided with a clip, loop, necklace, band, pin or other device (not shown for purposes of simplicity and clarity) to affix or hang the monitor 32 to or from such an article of clothing or to the panelist's wrist, neck or elsewhere. In certain embodiments, the enclosure 138 has a size and shape similar to a pager, or cellular telephone. In certain embodiments, enclosure 138 has a size and shape similar to a credit card or smart card, so that it can be carried in a panelist's pocket or wallet or attached to a keychain. In still other or related embodiments, the enclosure 138 takes the form of a wristwatch, wristlet, card case, key fob, change purse, article of jewelry or other decorative or useful article, or else is adapted to be carried by or attached to one or more of the foregoing.

RF receiver 114 has an input coupled with antenna 118 to receive the location signal and is operative to detect the data therein and supply it at an output coupled with processor 130 in a form suitable for input to the processor 130. Preferably, the receiver 114 is operated only periodically, or from time to time, in order to conserve power in the portable monitor 32. For example, in certain embodiments the receiver 144 is turned on for a 10 second period during a repeating 30 second interval.

Where the transmitter 86 transmits the location signal in a different form, such as infrared or visible light, wireless receiver 114 and antenna 118 are replaced in other embodiments of the portable monitor 32 by a suitable light sensor and conditioning circuitry coupled with the light sensor and operative to detect the data contained in the location signal and supply it in a suitable form to the processor 130. Where the transmitter 86 instead transmits an acoustic location signal, in certain embodiments of portable monitor 32 the microphone 122 and conditioning circuitry 126 serve to receive the location signal and supply it in suitable form to the processor 130. In certain ones of such embodiments the processor 130 serves to detect the data contained in the location signal transmitted in acoustic form.

The processor 130 is also operative to store the detected location data with a time stamp produced by processor 130 or else by a separate clock (not shown for purposes of simplicity and clarity). Where the processor continues to receive the same location code, in certain embodiments it produces duration data indicating a duration of continuous receipt of the same location data and stores it in association with the location data and time stamp. In certain other embodiments, in place of duration data, the processor instead stores an ending time stamp representing a point in time when it no longer continues to receive the same location data. In still other embodiments, the processor simply stores each detection of the location data with a respective time stamp associated therewith.

The embodiments of portable monitor 32 illustrated in FIG. 5 also serve to monitor exposure of the panelist to media data having an acoustic component, such as radio and television broadcasts, prerecorded content and streaming media. This is achieved in certain embodiments by processing acoustic data received by microphone 122 in processor 130. Processor 130 analyzes the acoustic data to detect the presence of an ancillary code therein or to extract a signature therefrom, which can be used to identify or otherwise characterize the media data. Suitable analysis techniques are disclosed in published U.S. patent application Ser. No. 20030005430 A1 in the name of Ronald S. Kolessar, assigned to the assignee of the present invention and hereby incorporated herein by reference in its entirety. The monitor 32 stores such media data exposure data in storage 134 together with time stamps representing timing of exposure thereto. Preferably, the time stamp is obtained from the same source as that stored with the data indicating detection of the location data so that the time stamps are all on the same predetermined time base.

In certain embodiments, a commercial establishment signal is transmitted to the monitor 32 by a transmitter other than those employed as in FIG. 1 to represent particular locations within a commercial establishment. Such a transmitter used to transmit a commercial establishment signal, containing data such as commercial establishment identification data, commercial establishment location data or other data representing a commercial establishment, comprises an RF transmitter in certain embodiments, and in others comprises a light signal transmitter which transmits infrared or visible light.

In still other embodiments, an acoustic transmitter is employed to transmit the commercial establishment signal. An embodiment of such an acoustic transmitter is illustrated in FIG. 5 as acoustic transmitter 112. Acoustic transmitter 112 is positioned to emit acoustic energy such as broadcast, streaming or reproduced audio (for example, music) and/or public address audio (such as announcements to shoppers), within the commercial establishment, such as the exemplary commercial establishment 10 schematically illustrated in FIG. 1. A source of such audio is represented by device 116 of transmitter 112.

Acoustic transmitter 112 also comprises an encoder 120 which receives the audio from source 116 and encodes the commercial establishment data therein. Encoder 120 evaluates the ability of the received audio to mask the data when encoded in the audio and produces or adjusts the level, frequency, phase and/or other characteristic of the data to be encoded or as encoded, so that the code is inaudible when the audio is reproduced as sound. The encoded audio is output by the encoder 120 to a speaker 124 which emits the encoded audio as acoustic energy.

The encoder 120 in certain embodiments comprises an encoder of the kind disclosed in U.S. patent application Ser. No. 10/302,309 in the names of James M. Jensen and Alan R. Neuhauser, assigned to the assignee of the present application and incorporated herein by reference in its entirety and/or of the kind disclosed in U.S. Pat. No. 5,764,763 in the names of James M. Jensen, et al, assigned to the assignee of the present application and incorporated herein by reference in its entirety.

In certain embodiments the audio supplied from the source 116 is already encoded with the commercial establishment signal, for example, by encoding the audio and storing it for later reproduction. In still other embodiments, rather than encode an audio signal the acoustic transmitter samples the ambient acoustic energy to evaluate its ability to mask the commercial establishment signal and emits the commercial establishment signal having appropriate characteristics to ensure that the ambient acoustic energy will mask it. Embodiments of such acoustic transmitters are disclosed in U.S. published patent application 20030171833 A1, mentioned above.

In certain embodiments of the present invention which employ acoustic transmitters to transmit location signals and/or commercial establishment signals, the personal monitor 32 employs the microphone 122 to receive such acoustic signals and detects the data therein by means of the processor 130. In certain ones of such embodiments, the processor 130 advantageously employs a detection technique disclosed in U.S. Pat. No. 5,764,763, mentioned above, to detect the data encoded in the various acoustic signals.

In certain embodiments, acoustic transmitters are employed both to emit location signals at various locations throughout a commercial establishment, but also to transmit a commercial establishment signal. In such embodiments it is possible to dispense with the use of an RF receiver in monitor 32. In certain ones of such embodiments used to monitor a panelist's presence at or near a small commercial establishment, such as a kiosk in a shopping mall, an acoustic transmitter is employed to transmit an acoustic signal in the vicinity of the commercial establishment containing commercial establishment data identifying or otherwise relating to it. When a panelist carrying a monitor 32 approaches such a commercial establishment closely enough so that the panelist can perceive it or the products or services it offers, the monitor 32 detects and stores the commercial establishment data to record the panelist's presence.

In certain embodiments wherein the location transmitters 36, 40, 56, 70 and 78 comprise acoustic transmitters, the acoustic transmitters transmit acoustic signals containing both location data and commercial establishment data to the monitor 32 which detects and stores both of these data from the received acoustic signal. In certain advantageous embodiments, both the location data and the commercial establishment data are encoded and detected according to techniques disclosed in U.S. patent application Ser. No. 10/302,309, mentioned above. In one such encoding technique, the location data and commercial establishment data are transmitted repeatedly, but each has a different duration. The monitor 32 employs two accumulators, one of which is a register having a length selected to accumulate the location data and the other of which is a different register having a length selected to accumulate the commercial establishment data. Although components of each of the data are accumulated in both registers, a register having a length selected to accumulate the location data, for example, will additively accumulate components of the location data, but will not accumulate corresponding components of the commercial establishment data, so that the commercial establishment data will appear as noise in this register.

Figure 6:
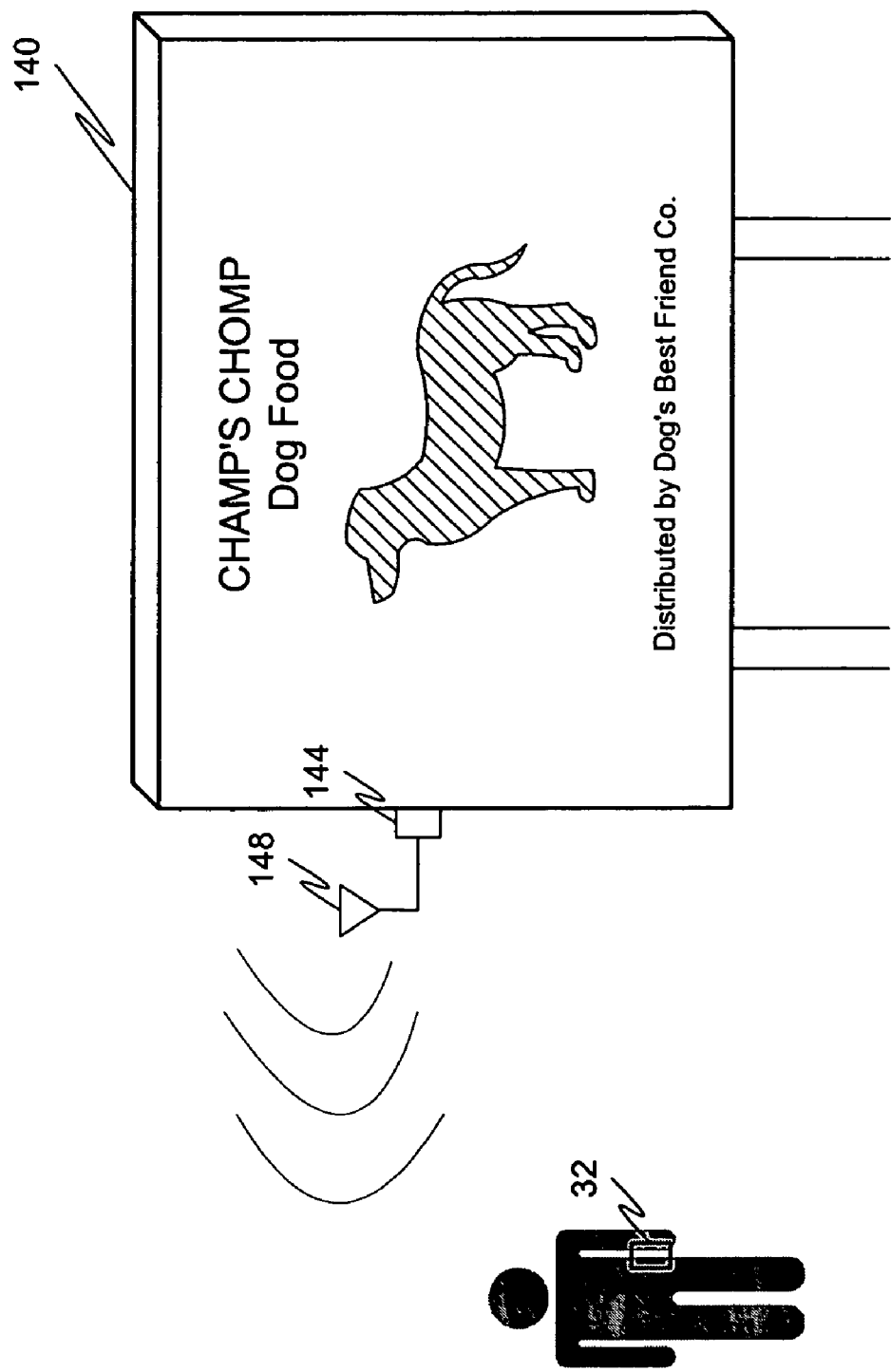
FIG. 6 illustrates use of the portable monitor of FIG. 5 for measuring exposure of the panelist carrying the portable monitor to a media display in accordance with certain embodiments of the present invention.

In certain embodiments portable monitor 32 serves to monitor exposure to media displays in outdoor settings, such as highways, railways, and walkways, and/or in indoor settings, such as malls, subways, railway stations, bus stations, airports and building lobbies. FIG. 6 illustrates a use of monitor 32 for this purpose, in particular, to monitor exposure of a panelist carrying portable monitor 32 to a billboard advertisement, in FIG. 6 shown as an advertisement 140 for a fictitious dog food product. In the embodiment of FIG. 6, an RF transmitter 144 drives an antenna 148 to transmit a billboard proximity signal at a power level chosen to ensure that billboard proximity data contained in the signal can only be detected by portable monitor 32 when it is positioned at a location from which the panelist can view the billboard advertisement. The billboard proximity data is stored by the monitor 32 along with a time stamp representing a time of exposure to the billboard advertisement 140. Preferably, the time stamp is obtained from the same source as that stored with the data indicating detection of the location data so that the time stamps are all on the same predetermined time base.

In certain embodiments receiver 114 of portable monitor 32 is arranged to receive the billboard proximity signal and detect the billboard proximity data therein. In other embodiments, a different wireless receiver is included in monitor 32 for this purpose. Further embodiments of media display exposure monitoring means suitable for use in monitor 32 are disclosed in U.S. patent application Ser. No. 10/329,132 in the names of Jack K. Zhang, Jack C. Crystal and James M. Jensen, assigned to the assignee of the present application and hereby incorporated by reference herein in its entirety. Still further embodiments of media display exposure monitoring means suitable for use in monitor 32 are disclosed in U.S. patent application Ser. No. 10/640,104 in the names of Jack K. Zhang, Jack C. Crystal, James M. Jensen and Eugene L. Flanagan III, assigned to the assignee of the present application and hereby incorporated by reference herein in its entirety.

Figure 7:
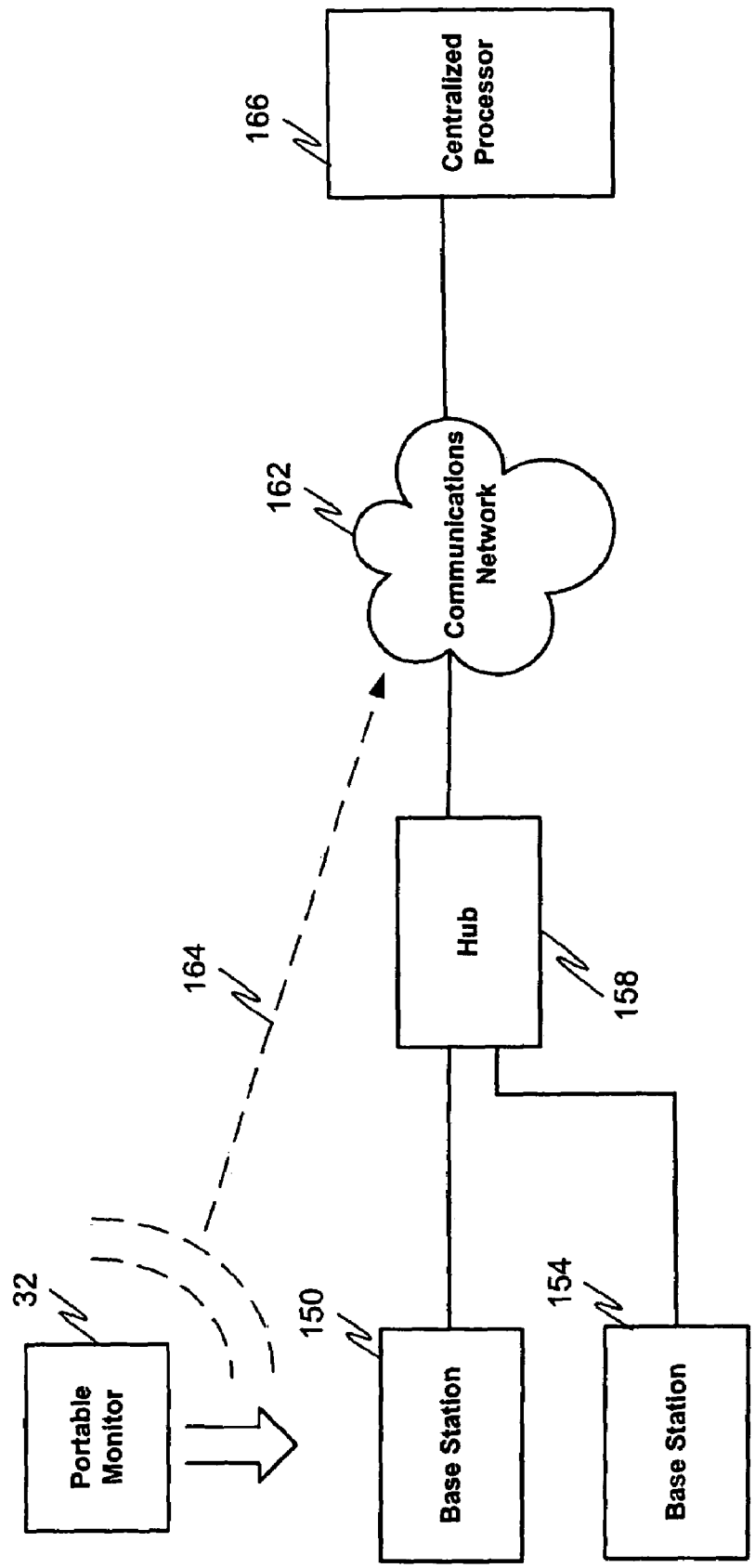
FIG. 7 is a block diagram of a system for downloading data gathered by the portable monitor of FIG. 5 to a centralized processor.

FIG. 7 illustrates a system for communicating the data stored in the personal monitor 32, as well as other personal monitors 32 assigned to other members of the same household acting as panelists in the same study, to a centralized processor 166 for use in producing reports (e.g., by a market research company) of interest to store managers, distributors, manufacturers, other advertisers, media organizations, etc. In certain embodiments, from time to time, or periodically, each panelist in the household docks his/her portable monitor 32 in a respective base station 150, 154 to download data stored in the portable monitors. The monitor 32 communicates with the base station by means of the coupling device 136 (see FIG. 5), which in certain embodiments is an optoelectronic coupling device. In certain embodiments, the monitor communicates with the base station by means of an RF transceiver or other wireless transceiver (not shown for purposes of simplicity and clarity) without docking the monitor in the base station. This communication is initiated either by the monitor 32 or the base station 150, 154, periodically, at a predetermined time or from time to time. In certain further embodiments, the portable monitor 32 comprises a wireless network transceiver (not shown for purposes of simplicity and clarity) to establish a wireless link 164 to the communications network 162 to download data, using a WiFi or other wireless networking protocol. In still further embodiments, the portable monitor 32 comprises a cellular telephone module (not shown for purposes of simplicity and clarity) to establish a wireless link with a telephone network to download data.

Once the data has been downloaded, the storage 134 of the monitor 32 is reset to store further data. The base stations may be, for example, those disclosed in U.S. Pat. No. 5,483,276 to Brooks, et al., assigned to the assignee of the present invention and hereby incorporated herein by reference in its entirety. The base stations 150, 154 communicate with a communications hub 158 also located in the household for communication via a network 162 to the centralized processor 166 located remotely from the household. The centralized processor 166 likewise receives data from other panelists' households to produce reports as mentioned above.

The centralized processor 166 stores the received data in one or more databases from which it is accessed to produce such reports. A database for use in storing the downloaded data gathered by monitors 32 in various commercial establishments, for use in producing reports concerning consumer behavior in such commercial establishments, is now described with reference to FIGS. 3 and 8. In certain embodiments, the database is a relational database. FIG. 8 illustrates a table 170 that stores records identifying the various transmitters 86 (FIG. 5) employed in the consumer behavior study by transmitter ID along with the commercial establishment (a retail store in this illustration) in which it is located and the specific location of the transmitter therein. For example, row 174 of table 170 provides an examplary record for a transmitter having ID "9562" installed in a fictitious commercial establishment, Ed's Emporium, in the village of Bayville and located near the entrance of this commercial establishment.

Table 170 also provides data identifying a product or promotional display at the location of certain ones of the transmitters 86, as well as the distributor or manufacturer of such product or promotional display. For example, row 178 of FIG. 8 provides an examplary record for a transmitter having transmitter ID "8723" installed in the fictitious commercial establishment mentioned above and at the location of a fictitious product, Champ's Chomp dog food, offered for sale in the commercial establishment. The record of row 178 also identifies the manufacturer or distributor of the product, here indicated as a fictitious business entity, Dog's Best Friend. Similarly, table 170 includes many other such records, each for a respective transmitter identified by its transmitter ID, and indicating its location by commercial establishment, in-store location and store owner or client, and as appropriate, either the product or promotional display at such location, and its distributor or manufacturer. It is noted that all of the clients or store owners, as well as the products and their respective manufacturers or distributors listed in table 170, are fictitious and serve only to illustrate exemplary records.

In certain embodiments, the table of FIG. 8 is compiled from data supplied by personnel engaged to install the transmitters in the various commercial establishments participating in the study. In certain embodiments, the data is supplied in written form by such personnel to data entry personnel who populate the table 170 of FIG. 8. In certain embodiments, the personnel instead log the locations of previously installed wireless transmitters and distinctive data provided thereby. Such previously installed transmitters include wireless communication devices installed with intelligent shelves. The intelligent shelves serve to gather data concerning the products placed thereon for inventory control purposes and communicate such data as well as the identity of the intelligent shelf to a data gathering system of the commercial establishment. Certain embodiments of the present invention make use of the identity data where it is transmitted wirelessly from the intelligent shelf. Certain of these embodiments also gather data concerning the products placed on the intelligent shelves for populating the "product" field of the table of FIG. 8. Preferably the data is compiled in the table from records communicated from portable electronic devices in the possession of the personnel installing or logging the transmitters in the various participating establishments. Suitable electronic devices for this purpose are disclosed in U.S. patent application Ser. No. 10/800,884, filed Mar. 15, 2004, in the names of Jack K. Zhang and James M. Jensen, assigned to the assignee of the present application and incorporated herein by reference in its entirety.

As described above, FIG. 3 illustrates a table recording detections of various ones of the transmitters 86 by the monitor 32, along with the times at which each was detected and the duration of continuous detection of the same transmitter location signal. The table of FIG. 3, together with the table of FIG. 8 comprise a database providing the ability to map panelist exposures to various products and promotional displays within the participating commercial establishments as well as to assess traffic flow through the participating commercial establishments. It is thus possible to produce reports of various kinds useful to the managers of such commercial establishments as well as the distributors and manufacturers whose products are offered for sale therein.

In certain ones of such reports, the presence/exposure data of FIG. 3 and the data of FIG. 8 is processed to estimate the frequency, duration and density of exposure of consumers to various locations, products and promotional displays within each of the participating establishments whether based on time of day or otherwise. By means of the table of FIG. 8, such data is readily presented by overlaying the same on a layout map of the establishment, and the identity of the products and promotional materials at the corresponding locations is likewise readily presented on the same map as an overlay in correspondence with the frequency, duration and density of exposure data described above to enable store managers, manufacturers and distributors to assess the exposure of various products and promotional materials in the commercial establishment. It is thus possible based on such reports to formulate placement recommendations for products and promotional materials in commercial establishments.

It is likewise possible with the same data to produce traffic flow reports which enable the managers and other individuals to determine the locations of "hot spots" and "cold spots" within their commercial establishments. Managers are thus enabled to evaluate whether changes should be made in the layouts of their establishments to improve customer traffic and increase exposure of product and service offerings.

As noted above, in certain embodiments of the personal monitors 32, not only is such data gathered but also data indicating exposure to media data such as television and radio broadcast exposure, as well as exposure to media displays, both outdoor and indoor. The systems and methods of the present inventions thus provide integrated data measuring not only behavior of consumers within commercial establishments but also exposure of such consumers to media data and the advertisements conveyed thereby. It is thus possible to evaluate the effects of the exposure to advertising of predetermined individuals to their behavior in commercial establishments, especially in regard to interest in particular products that may be stimulated by such advertising.

Further embodiments of a system and method for monitoring the presence and movements of a panelist within a commercial establishment in accordance with certain embodiments of the present invention are now described. In certain embodiments the receiver 114 of portable monitor 32 receives one or more signals from one or more wireless transmitters within or near the commercial establishment, but not associated with particular locations within the commercial establishment, and generates location data indicative of a location of the portable monitor 32 within the commercial establishment based upon the received signals. In other embodiments, the monitor 32 includes a GPS receiver (not shown for purposes of simplicity and clarity) to obtain such position data in the form of latitude and longitude. In certain advantageous embodiments, the monitor employs an assisted GPS location system.

In certain other embodiments the portable monitor transmits a signal that is received by one or more receiving devices within or near the commercial establishment to determine the location of the portable monitor. In still other embodiments, the portable monitor includes a cellular telephone module (not shown for purposes of simplicity and clarity) that communicates with a cellular telephone system to obtain data therefrom representing the location of the portable monitor 32 based on signals received from the cellular telephone module. Such location data is provided as latitude and longitude or in another usable form. In still further embodiments, the portable monitor 32 employs at least one of the following techniques to generate the location data: an angle of arrival (AOA) technique, a time difference of arrival (TDOA) technique, an enhanced signal strength (ESS) technique, a location fingerprinting technique, and an ultra wideband location technique. Each of these techniques is now briefly described.

The angle of arrival (AOA) technique determines the direction of a signal received from a radio frequency (RF) transmitter. This can be done by pointing a directional antenna along the line of maximum signal strength. Alternatively, signal direction can be determined from the difference in time of arrival of the incoming signals at different elements of the antenna. A two-element antenna is typically used to cover angles of ±60 degrees. To achieve 360-degree coverage, a six-element antenna can be used. However, a single mobile directional antenna can give only the bearing, not the position, of a transmitting object.

With two directional antennas spaced well apart, however, the position of a transmitting device in a plane can be computed. In this method, also known as the angle of arrival (AOA) method, transmitter position is determined from the known (fixed) position of the receivers' antennas and the angle of arrival of the signals with respect to the antennas. In certain embodiments the portable monitor 32 includes a transmitter that enables its location to be determined in accordance with the angle of arrival method.

The time difference of arrival (TDOA) technique is based upon the similar concept that the difference in time of arrival between signals received at antennas at different locations can be used to determine position. Given the speed of light and known transmit and receive times, the distance between a transmitter and the receiver antenna can be calculated. In certain embodiments the portable monitor 32 includes a transmitter that enables its location to be determined in accordance with the time difference of arrival technique.

In an alternative time difference scheme, the monitor and the antennas reverse roles: the antennas are transmitters and the portable monitor 32 incorporates a receiver. This technique is known as forward link trilateration (FLT). This is relatively simple to implement in some code-division multiple access (CDMA) wireless systems, where the time difference of arrival can be determined from the phase difference between pseudo-random noise code sequences of 0s and 1s transmitted from two antennas. In certain embodiments the portable monitor 32 includes a receiver, such as a CDMA cellular telephone receiver, that enables its location to be determined in accordance with the forward link trilateration method.

When the term "time difference of arrival technique" is used herein, the term is meant to encompass both the traditional time difference of arrival (TDOA) method and the forward link trilateration (FLT) method.

The enhanced signal strength (ESS) method provides improvements over conventional signal strength methods by overcoming such impediments as multipath effects, attenuation, and antenna orientation. The method involves taking in three-dimensional information on the objects, walls, and other features and obstructions within the commercial establishment, and using such information to simulate the RF signal propagation characteristics of wireless transmitting antennas in the area. A location system center stores the results in an RF database. The position of the portable monitor is determined by getting it to measure the signal strength of preferably three to five base transmitters. From this input plus information from the database, the system can calculate the position of the portable monitor. Inside large commercial establishments, such as malls and department stores with appropriate base transmitters located therein, the position of a portable monitor can be determined by means of the ESS method. In certain embodiments the portable monitor 32 includes a receiver that enables its location to be determined in accordance with the ESS method.

The location fingerprinting technique, instead of exploiting signal timing or signal strength, relies on signal structure characteristics. The technique turns the multipath phenomenon to good use by combining the multipath pattern with other signal characteristics, to create a signature unique to a given location. A location fingerprinting system includes a signal signature database of a location grid for a specific area. To generate this database, a device is walked through the area transmitting or receiving signals to or from a monitoring site. The system analyzes the incoming signals, compiles a unique signature for each square in the location grid, and stores it in the database.

To determine the position of a mobile transmitter or receiver, the system matches the transmitter's or receiver's signal signature to an entry in the database. Multipoint signal reception is not required, although it is preferable. The system can use data from only a single point to determine location. In certain embodiments the portable monitor 32 includes a transmitter or a receiver that enables its location to be determined in accordance with the location fingerprinting technique.

In certain ultra wideband location techniques a network of localizers determine relative locations in three-dimensional space by measuring propagation times of pseudorandom sequences of electromagnetic impulses. The propagation time is determined from a correlator which provides an analog pseudo-autocorrelation function sampled at discrete time bins. The correlator has a number of integrators, each integrator providing a signal proportional to the time integral of the product of the expected pulse sequence delayed by one of the discrete time bins, and the non-delayed received antenna signal. Using pattern recognition the arrival time of the received signal can be determined to within a time much smaller than the separation between bins.

In certain ultra wideband techniques, wireless ultra wideband transceivers are positioned at known stationary locations within the area to be monitored, and the portable monitor 32 includes a wireless ultra wideband receiver/processor that receives one or more timed pulses from the various transceivers and resolves the location of the portable monitor within the monitored area based on the locations of the ultra wideband transceivers and time-of-flight measurements of the pulse or pulses. In certain embodiments, the portable monitor 32 includes an ultra wideband transmitter and a plurality of interacting receivers in stationary positions receive a pulse from the transmitter of the portable monitor 32 to determine its location. In certain of the embodiments, the stationary transceivers or receivers are coupled by cabling, while in others they are untethered.

Still another technique for monitoring the presence and movements of a panelist in certain embodiments of the invention employs the position system developed by Place Lab in Seattle, Wash. U.S.A. In this positioning system, the portable monitor 32 uses its receiver 114 to monitor the unique identifiers or other location specific data transmitted by Wi-Fi access points, cellular telephone transmitters, Bluetooth devices and/or other sources of such data. The received location specific data is then used to address a database of transmitter locations and corresponding identifiers to determine a location of the monitor 32. In certain embodiments, the database is contained in the storage of monitor 32 and the location determination is carried out in monitor 32. In other embodiments, the database is stored elsewhere, such as in base station(s) 150, 154, hub 158 or centralized processor 166, and the position determination is made where appropriate.

Figure 9:
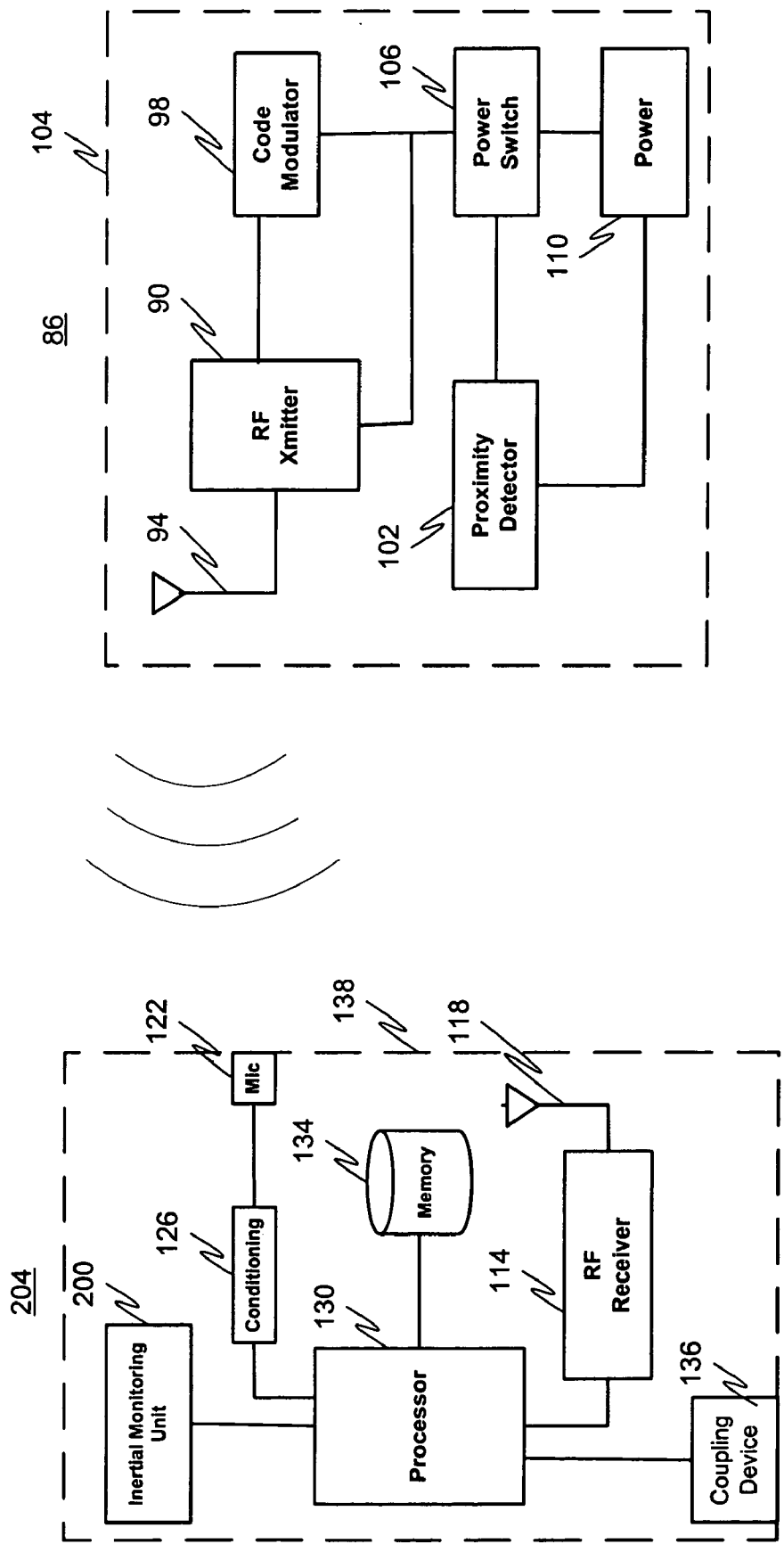
FIG. 9 provides block diagrams of certain embodiments of a location signal transmitter and portable monitor wherein the portable monitor tracks its location using an inertial monitoring device.

Referring now to FIG. 9, a system is illustrated in block form for measuring the exposure of a panelist to media data and media displays, as well as for monitoring the presence and movements of the panelist within a commercial establishment and between commercial establishments, in accordance with certain embodiments of the present invention. In FIG. 9, elements corresponding to those of FIG. 5 bear the same reference numerals. Similar to the system shown in FIG. 5, the system of FIG. 9 includes a portable monitor 204 arranged to be carried on the person of a panelist. The portable monitor 204 receives one or more signals from one or more terrestrial sources and/or satellite sources, and generates data indicative of a location of the portable monitor 204. In certain embodiments, the signals used for this purpose are obtained from a cellular telephone system, Wi-Fi access points, Bluetooth device or from a GPS or assisted GPS receiver, as described above. In certain embodiments, a TV-GPS receiver is employed, such as the TV-GPS devices developed by Rosum Corporation. TV-GPS employs television synchronization signals to supplement GPS and is discussed in the white paper "A New Positioning System Using Television Synchronization Signals" (published by Rosum Corporation, date unknown), which is incorporated herein by reference. In certain embodiments, The use of television synchronization signals, without GPS, may be employed to ascertain the location of portable monitor 204. Alternatively, suitable radio synchronization signals or other suitable broadcast signals may be employed.

In the system of FIG. 9, the location data is provided by an inertial monitoring device 200 which forms a part of portable monitor 204 and the received signals are used to provide location calibration data to the inertial monitoring device. Such calibration, which is described more fully below, may be performed periodically or from time to time, or whenever the signals from the terrestrial and/or satellite sources are received.

In the embodiment of FIG. 9 the inertial monitoring device 200 of the portable monitor 204 is calibrated by means of a signal transmitted by a calibration transmitter or transmitters 86 located in or in proximity to a commercial establishment in which the movements of the panelist wearing the monitor are to be tracked. Advantageously, in certain embodiments the calibration transmitter or transmitters are located by an entrance or exit of the establishment through which the panelist must pass to enter or leave the commercial establishment. The calibration signal is transmitted at sufficiently low power to ensure that it will be received only when the portable monitor is close by.

The inertial monitoring device preferably is small in size and lightweight. An advantageous embodiment of such an inertial monitoring device employs microelectromechanical sensors (MEMS) as either gyroscopic sensors and/or accelerometers to provide data from which the location of the monitor can be determined.

In certain embodiments to calibrate the inertial monitoring device 200 the portable monitor 204 employs satellite-based techniques, such as global positioning system (GPS) and/or server assisted GPS technology, and/or terrestrial techniques, such as an angle of arrival (AOA) technique, a time difference of arrival (TDOA) technique, an enhanced signal strength (ESS) technique, a location fingerprinting technique, a database look-up technique (such as that developed by Place Lab), and/or an ultra wideband location technique.

Figure 10:
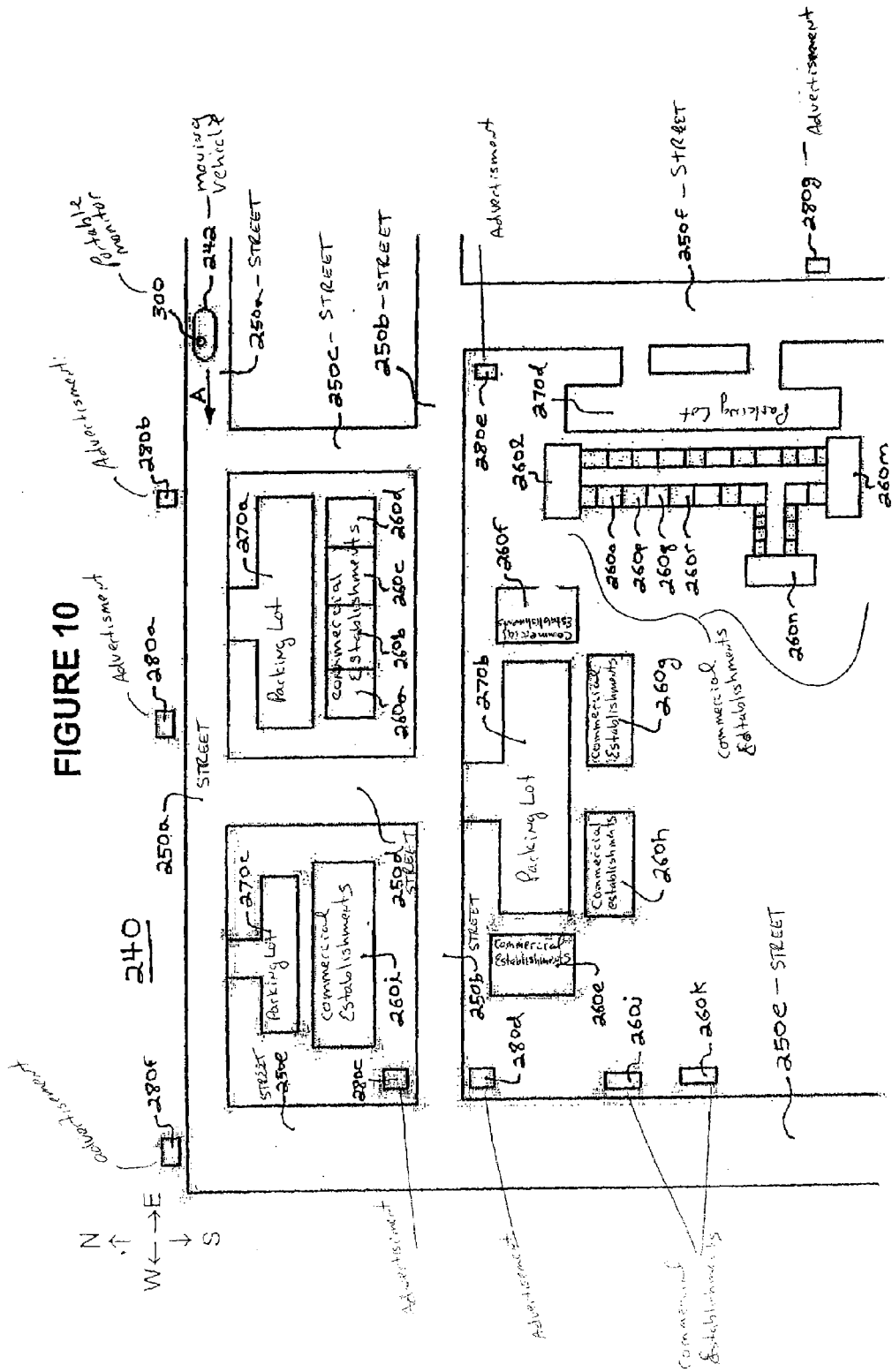
FIG. 10 is a schematic diagram of a map of an exemplary community for use in illustrating certain embodiments of the present invention.

Various further embodiments of systems and methods for monitoring the presence and movements of a panelist are now described. Referring now to FIG. 10, a schematic diagram 240 (hereinafter, map 240) representing a portion of a geographic community is schematically shown. Map 240 shows the community as having a plurality of streets 250, a plurality of commercial establishments 260, a plurality of parking lots 270, and a plurality of outdoor advertisements 280. For reference purposes, FIG. 10 shows streets individually identified (250a, 250b . . . 250f), commercial establishments 260 individually identified (260a, 260b . . . 260r), parking lots individually identified (270a, 270b . . . 270d), and outdoor advertisements individually identified (280a, 280b . . . 280g). Exemplary commercial establishment 260f is a temporary venue, such as a temporary entertainment exhibition.

Map 240 represents a hypothetical layout of streets, commercial establishment, parking lots and outdoor advertisements. In actuality, there would be numerous streets, commercial establishments, parking lots and outdoor advertisements within villages, towns, cities, states, etc. in which certain embodiments of the present invention may be utilized. Also, and as shown in FIG. 10, various commercial establishments have dedicated parking lots (e.g., 260i), various commercial establishments share parking lots (e.g., 260a-260d), and other commercial establishments have street parking only (e.g., 260k). With commercial establishments that share a parking lot, they may be included within a single structure (e.g., 260a-260d) (e.g., a retail "strip" mall, an outdoor shopping center, etc.) and other commercial establishments that share a parking lot may be "stand-alone" type structures (e.g., 260e-260h). Various commercial establishments may be contained within a single structure, such as an indoor shopping facility, an indoor mall, an office building (e.g., 260l-260r—some commercial establishments not identified to minimize clutter in FIG. 10). Still further, it is common for various commercial establishments to be adjacent to multiple parking lots for convenient access. In any event, map 240 shown in FIG. 10 is provided for illustrative and reference purposes only and is not intended to show a limitation of any embodiment described herein.

In accordance with certain embodiments, a portable monitor 300 (FIG. 11) is carried on the person of a panelist participating in a market research study to track the presence and/or movements of the panelist in areas external to commercial establishments and, in certain embodiments, also in areas within commercial establishments. As shown in FIG. 10, portable monitor 300 carried by the panelist is, at times, disposed within a moving vehicle 242 that is capable of traveling at different speeds. Moving vehicle 242 may be a motorized vehicle, such as an automobile, truck, SUV, electric scooter, etc., or may be a non-motorized vehicle, such as a bicycle, skateboard, etc. At other times, portable monitor 300 is carried by a panelist who is not disposed within the moving vehicle (e.g., walking, jogging, running, etc.), typically walking.

The portable monitor 300 includes the capability to identify its own location. In certain embodiments, portable monitor 300 includes a GPS receiver to obtain position signals from which position data in the form of latitude and longitude can be derived and, in certain advantageous embodiments, monitor 300 employs an assisted GPS location system. Portable monitor 300 also includes a storage containing a database of locations of "venues of interest," which are described below.

Figure 11:
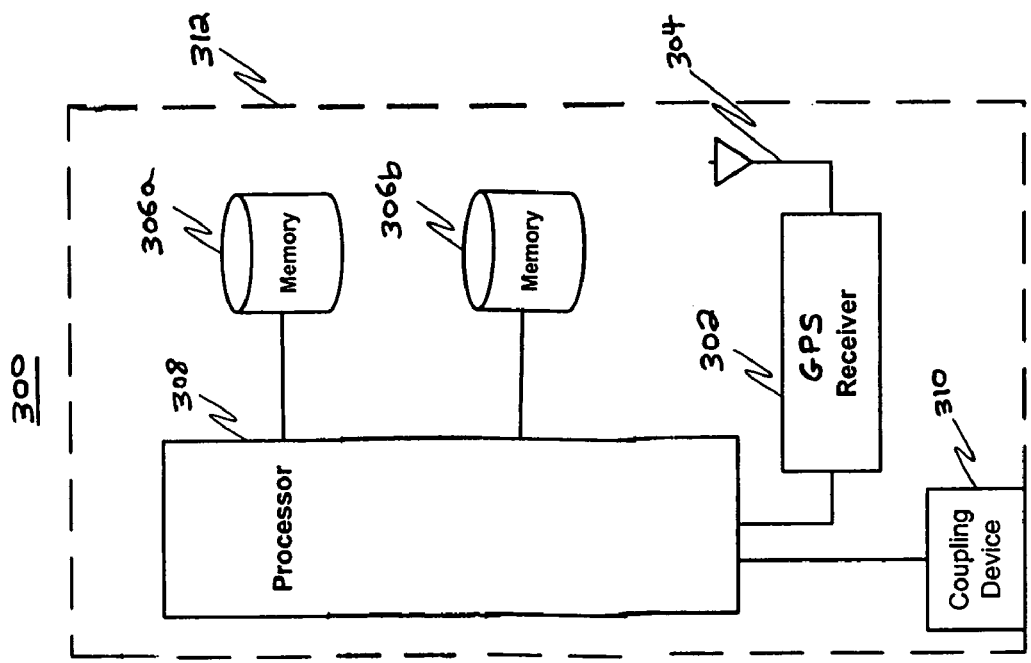
FIG. 11 provides a block diagram of a portable monitor in accordance with certain additional embodiments of the present invention.

An exemplary block diagram of an embodiment of the portable monitor 300 is schematically shown in FIG. 11. As shown, portable monitor 300 includes a GPS receiver 302, an antenna 304, a first storage 306a, a second storage 306b, a processor 308, a coupling device 310 and an enclosure 312 containing all of the foregoing elements of portable monitor 300. The enclosure preferably is sufficiently small to permit the portable monitor 300 to be carried in or on an article of clothing worn by the panelist, such as a belt, pocket, collar or lapel, or on the panelist's wrist or elsewhere. Coupling device 310 corresponds to and operates in a manner similar to coupling device 136 shown in FIG. 5, which was previously discussed. Data is downloaded from portable monitor 300 via coupling device 136 in accordance with the various manners previously discussed.

GPS receiver 302 has an input coupled with antenna 304 to receive location signals and is operative to detect the data therein and supply such data to processor 308 in a form suitable for processing by processor 308. Storage 306a includes the above-mentioned database of locations of "venues of interest." In certain embodiments, venues of interest are commercial establishments about which it is desired to acquire information during use of the portable monitor. For example, the venues of interest are all or selected ones of the commercial establishments 260a-260r (including other commercial establishments not identified in FIG. 10) and storage 306a contains a database of the locations of the entrances of each of these commercial establishments. If a commercial establishments contains multiple entrances, then the locations of the multiple entrances are stored within the database.

During operation of portable monitor 300, GPS receiver 302 is controlled to receive (via antenna 304) GPS signals from GPS satellites and produces the location data therefrom representing the portable monitor's current location. Where GPS receiver 302 employs an assisted GPS technique, receiver 302 also receives assist signals from a terrestrial source which assists receiver 302 in acquiring signals from the satellites. The portable monitor's current location can be derived by processor 308 or, in other variations, can be derived by receiver 302 which then supplies the portable monitor's location to receiver 308.

Processor 308 ascertains whether the portable monitor is in the vicinity of a venue of interest utilizing it's derived location and the database of locations of venues of interest. If the portable monitor is within a certain proximity to one or more venues of interest, then the portable monitor creates a record of the identified venue of interest(s), or data based thereon, together with a time stamp indicating the time (and date) of when portable monitor 300 initially arrived in the vicinity of the identified venue of interest. In certain embodiments, the portable monitor creates the record after the panelist carrying the portable monitor enters the commercial establishment. If, on the other hand, processor 308 ascertains that it is not with a certain proximity to any of the venues of interest within the database, then no record is created.

Portable monitor 300 continuously monitors its position and stores all venues of interest visited, together with a time stamp for each venue of interest visited, by the panelist carrying the portable monitor. The data is retained within storage 306b. In certain other embodiments, storage 306a and 306b are implemented by a single storage within the portable monitor.

FIG. 12 illustrates an embodiment of a table 320 within storage 306b of portable monitor 300, containing the venues of interest visited together with the time of day and date. In the exemplary table 320 of FIG. 12, each row identifies a different commercial establishment visited and the time and date the respective commercial establishment was visited. As shown from the data stored in table 320, the panelist carrying portable monitor 300 visited commercial establishment 260a at 10:00 am on Feb. 25, 2005, commercial establishment 260b at 10:15 am, commercial establishment 260i at 10:50 am, commercial establishment 260e at 12:30 pm, and then commercial establishment 260g at 1:20 pm (13:20).

In certain advantageous embodiments, portable monitor 300 maintains a record of each venue of interest visited and also tracks the duration of each visit. Processor 308, together with GPS receiver 302 and antenna 304, tracks the location of the panelist carrying portable monitor 300 and creates a record when the panelist is at the entrance of one of the venues of interest within storage 306a. The created record identifies the venue of interest and time/date stamp. Upon entry into a commercial establishment identified as a venue of interest, certain ground position signals cannot be received by the GPS receiver 302, via antenna 304, and thus the location of the portable monitor cannot be obtained in this manner. Portable monitor 300, at this point, periodically monitors for the GPS signals. When the GPS signals are again received (for convenience, also called "recaptured" herein), the location of the portable monitor is ascertained. If the ascertained location corresponds to the entrance to the commercial establishment (i.e., venue of interest) just visited, or another entrance to that commercial establishment in the case the commercial establishment has multiple entrances, then the record previously created is supplemented with the duration of the visit to that commercial establishment. The duration is the time difference between the time stored in the record, and the time when the GPS signals were recaptured. In a variation, the record may instead, or also, include the time of departure.

FIG. 13 illustrates an embodiment of a table 322 within storage 306b of portable monitor 300, containing a record of each venue of interested visited, the time and date of entry and the duration of the visit. In the exemplary table 322, the panelist carrying portable monitor 300 visited commercial establishment 260a at 10:00 am for 13 minutes. Two minutes then passed before the panelist visited commercial establishment 260b at 10:15 am for 25 minutes. Ten minutes then passed, presumably the time for the panelist to drive from parking lot 270a to parking lot 270c, before visiting commercial establishment 260i at 10:50 am. The panelist visited commercial establishment 260i for 60 minutes, departing the commercial establishment at 11:50 am. The next record indicates that the panelist visited commercial establishment 260e at 12:30 pm. Thus, the panelist spent 40 minutes for other activities, including at least the time to drive to parking lot 270b. The panelist departed commercial establishment 260e 40 minutes later, at 1:10 pm (13:10) and passed by commercial establishment 260h at 1:12 pm (13:12), likely not entering the commercial establishment for any meaningful period of time. Finally, the panelist visited commercial establishment 260g at 1:20 pm (13:20) for 30 minutes.

One record, shown in row 324 in table 322, identifies that the panelist visited commercial establishment 260h at 1:12 pm (13:12) for 0 minutes. However, since the GPS signals were never "lost" (i.e., always received), monitor 300 determines that the panelist did not enter the commercial establishment 260h. Nevertheless, since the panelist passed by the entrance of commercial establishment 260h, a record was created, but the duration of the visit is identified as 0 minutes. Certain embodiments described herein track the duration of time a panelist visits commercial establishments or other venues of interest. These and other embodiments maintain a record, including a time/date stamp, of each commercial establishment (and other venues of interest) that are passed by, in relatively close proximity, by a panelist during the panelist's daily travels.

In one embodiment, a record is not created (or, alternatively, created but then erased or otherwise not permanently stored in storage) if the duration of the visit is 0 minutes. In another embodiment, the record is not maintained if the duration of the visit is less than a predetermined number of minutes, for example, 3 minutes, so that very short visits to commercial establishments are not tracked.

In certain embodiments, portable monitor 300 further tracks the duration a panelist carries out "window shopping." That is, records are created that further identify the amount of time a panelist is in the vicinity of a commercial establishment entrance (or other venue of interest). Like certain embodiments previously described, processor 308 creates a record when the panelist is at the entrance of a venue of interest. If the GPS signals are never "lost" (i.e., always received) and the ascertained current location of the portable monitor remains in that same position, or a position nearby, then the amount of time the panelist stays in that area is tracked and included within the created record.

FIG. 14 illustrates an embodiment of a table 326 within storage 306b of portable monitor 300, containing records that also include the tracked amount of time panelists "window shop." Table 326 provides the same information shown in table 322 of FIG. 13, but further indicates that the panelist spent a meaningful amount of time in front of two commercial establishments visited. The panelist spent 5 minutes in front of commercial establishment 260i, in addition to being inside that commercial establishment for 60 minutes, as shown in row 328. The panelist also spent 7 minutes in front of commercial establishment 260h, even though the panelist did not spend anytime inside that commercial establishment, as shown in row 330. Although the information does not identify what the panelist did for 7 minutes in front of commercial establishment 260h, such information combined with data from other panels, such as surveys, provides very useful information. For example, data from another panel may indicate that the panelist purchased, perhaps at a future date and even in a different commercial establishment, a product that was advertised in a window display of commercial establishment 260h on the given day the panelist spent 7 minutes in front of commercial establishment 260h, thus suggesting a likely connection between the two events.

In certain embodiments, a venue of interest within storage 306a of portable monitor 300 is an outdoor advertisement or other type of display. Referring back to FIG. 10, the exemplary map 240 shows outdoor advertisements 280a-280g. The outdoor advertisements may be billboard advertisements or other advertisements visible or audibly heard from outside commercial establishments. Storage 306a identifies the location of, for example, each outdoor advertisement 280a-280g shown in FIG. 10. When a panelist carrying portable monitor 300 travels near an outdoor advertisement, the panelist becomes exposed to that advertisement and portable monitor 300 creates a record of that exposure. That is, each time the panelist comes within the vicinity of a location of one of the outdoor advertisements within storage 306a of portable monitor 300, a record is created that includes data referencing that outdoor advertisement together with a time/date stamp.

Referring again to map 240 shown in FIG. 10, a panelist traveling within vehicle 242 and carrying portable monitor 300 travels, for example, from the position shown in the figure, along street 250a, in the direction of arrow A, making various stops along street 250a and turns left onto street 250e The panelist then turns left onto street 250b and parks in parking lot 270b. The panelist later departs from parking lot 270b, turning right onto street 250b and then turns right onto street 250f. FIG. 15 illustrates an embodiment of a table 334 within storage 306b of portable monitor 300, containing records created as a result of this exemplary path of travel. As shown in the exemplary table, the panelist passed advertisement 280b at 9:52 am, passed advertisement 280a at 10:44 am, passed advertisement 280f at 12:20 pm, passed advertisement 280d at 12:25 pm, and passed advertisement 280e at 2:00 pm (14:00).

In certain embodiments, portable monitor 300 further identifies within each stored record the direction of travel of the portable monitor when the panelist is within the vicinity of one of the outdoor advertisements within storage 306a of portable monitor 300. Direction of travel is highly pertinent for displays that have the physical attribute of being visible in one direction of travel, but not another. For example, advertisement 280a may be a billboard that faces east, with no display that faces west. Conversely, advertisement 280b may be a billboard that faces west, with no advertisement that faces east. Advertisement 280f is visible to both north-bound and west-bound traffic. Advertisement 280d contains one advertisement that is visible to only south-bound traffic and a different advertisement that is visible to only north-bound traffic. Advertisement 280e is visible to both west-bound and east-bound traffic (e.g., the same display is provided on both sides of the billboard).

Portable monitor 300 derives the direction of travel by assessing the panelist's path of travel using the location coordinates ascertained. In certain other embodiments, direction of travel is ascertained using one or more devices suitable for ascertaining direction, such as a gyroscope or other appropriate device, or other method described herein.

In certain embodiments, portable monitor 300 contains within storage 306a locations of outdoor advertisements and further contains for each advertisement the direction or a range of directions from which the advertisement is viewable. Thus, a west-facing advertisement is viewable by a panelist traveling westward, but generally is viewable by a panelist traveling in a direction within the range extending from south-west travel to north-west travel. Various displays may be designed to enable for a wider (or narrower) range of viewing.

When a panelist travels near an outdoor advertisement, portable monitor 300 ascertains, based upon the assessed direction of travel of the panelist, whether the advertisement is viewable. If so, the above-discussed record is created, identifying the advertisement along with a time/date stamp. On the other hand, if the advertisement is ascertained to not be viewable, then no record is created. If a structure contains multiple advertisements, each viewable from a different direction, then the advertisement assessed to be viewable is identified in the created record.

In another embodiment, storage 306a within portable monitor 300 does not identify the direction(s) from which the advertisements is viewable and portable monitor 300 does not assess whether an advertisement is viewable. Instead, a record is created when a panelist comes within the vicinity of an advertisement identified in storage 306a and the ascertained direction of travel of the panelist is stored within the record. FIG. 16 illustrates an embodiment of a table 336 within storage 306b of portable monitor 300, containing the records shown in FIG. 15 and additionally identifying, in each record, the ascertained direction of travel of the panelist. Computations as to whether advertisements were likely seen are made by centralized processor 166 or other processor after the records stored within portable monitor 300 have been downloaded to centralized processor 166, as previously discussed. A database associated with or accessible by centralized processor 166 (or other system separate from portable monitor 300) contains data indicative of the direction or range of directions from which each advertisement (identified in storage 306a) is viewable.

Referring to FIG. 16, the panelist was traveling west as he/she approached advertisements 280b, 280a and 280f, was traveling south when advertisement 280d was approached, and was traveling east when advertisement 280e was approached. Compass directions or other appropriate directional information may be utilized. In another embodiment, any change of direction by the panelist when in the vicinity of an advertisement or other type of venue of interest is stored within the record. The change of direction may provide additional useful information when assessing the likelihood the advertisement was seen.

In certain preferred embodiments, venues of interest within storage 306a of portable monitor 300 include both commercial establishments and outdoor advertisements so that the combined tracking information can be better utilized to assess the shopping habits of retail customers and to assess the effectiveness of outdoor advertising and other media exposure. In certain embodiments, a "visit" to each venue of interest represented by the data written in storage 306b, including passing by an outdoor advertisement venue of interest, is recorded. For each, a record is created in storage 306b that identifies (or includes data representative of) the venue of interest, the time and date of such visit, the duration of the visit inside the venue of interest, and the duration of the visit outside the venue of interest. FIG. 17 illustrates an embodiment of a table 338 within storage 306b of portable monitor 300, containing records reflecting the stored information. As shown in the exemplary table 338 of FIG. 17, the information provided is partially a combination of the information provided in table 326 of FIG. 14, regarding certain previously discussed embodiments, and the information provided in table 334 of FIG. 15, regarding other previously discussed embodiments. By including both commercial establishments and outdoor advertisements as venues of interest, the records created by portable monitor 300 enable the tracking of a single source, the panelist carrying the portable monitor, with respect to both the outdoor advertisements he or she is exposed to together with the commercial establishments visited by that individual during the same time period. In addition, the records created by portable monitor 300 enable retailers to assess whether there is a direct or an indirect correlation, among other things, between outdoor advertising and commercial establishment visiting patterns of retail customers.

Referring to table 338 shown in FIG. 17, the records created by portable monitor 300 collectively identify both the path of travel of the panelist and the pattern of commercial establishments particularly visited by the panelist during the course of a day. Depending on the advertisements, useful information is gleaned from the order of advertisements exposed to and subsequent commercial establishments visited. The amount of time a panelist is exposed to an outdoor advertisement also represents useful information. For example, a long traffic signal at the intersection of street 250a and 250e, resulting in the panelist being in the vicinity of, and exposed to, outdoor advertisement 280f for 1 minute, as indicated in row 340, represents particularly useful information. As another example, the panelist was at the intersection of streets 250e and 250b for 2 minutes, as indicated in row 342, thus being exposed to outdoor advertisement 280d for a relatively long period of time. These advertisements may be for the same or different commercial establishments, and may be for commercial establishments subsequently visited by the panelist. In any case, the data contained within the records are highly useful to assist retailers to better understand the shopping characteristics and habits of customers, as well as the effectiveness of advertising on such habits. In certain embodiments, In certain embodiments of the present invention, portable monitor 300 has two modes of operation. Portable monitor 300 initially operates in a first mode (also called "slow rate mode" herein) in which GPS receiver 302, via antenna 304, receives the GPS signals at a relatively slow rate, such as once every 30 seconds. That is, position tracking is carried out collectively by GPS receiver 302 and processor 308 once every 30 seconds (i.e., twice per minute). During operation in this first mode, portable monitor 300 ascertains whether it is disposed in close proximity to any one of the venues of interest within storage 306a. Portable monitor 300 continues to operate in the first mode while it ascertains that it is not disposed near a venue of interest. While portable monitor 300 operates in the first mode, battery life is substantially conserved due to the relatively low rate of operation of GPS receiver 302.

While operating in the first mode, if portable monitor 300 ascertains that it is disposed near a venue of interest, then it enters its second mode of operation (also called "high rate mode" herein) in which GPS receiver 302 is controlled to receive the GPS signals at a relatively higher rate, such as once every 2 seconds. In this second "high rate" mode of operation, portable monitor 300 creates records in accordance with certain embodiments already discussed herein. When the GPS signals cannot be obtained, portable monitor 300 enters the first "slow rate" mode of operation.

FIG. 18 shows a table 344 that identifies the mode of operation portable monitor 300 was operating in during the previously discussed exemplary path of travel by the panelist carrying the portable monitor. For each operation mode change, table 344 identifies when the mode change occurred and the "trigger" event that caused the mode change (date not shown in FIG. 18 for purposes of simplicity). Table 344 illustrates that portable monitor 300 operated in mode 1 for a substantial portion of the day in which it operated thus advantageously reducing the power consumption otherwise needed to track the panelist's movements as he/she travels and visits commercial establishments. In the example provided, portable monitor 300 was carried from 9:00 am till 2:30 pm (14:30). As shown in table 344, portable monitor operated in mode 1 for 293 minutes (approx.), and operated in mode 2 for 37 minutes (approx.)(rounding off seconds to next minute during mode 2 operation). Thus, portable monitor 300 operated in mode 1 nearly 8 times as long as it operated in mode 2. By operating in mode 1 in the example for roughly 88% of the total time of operation, portable monitor 300 substantially conserves battery power without sacrificing tracking capability.

In certain embodiments, portable monitor 300 operates in the first and second modes in the manner discussed, except portable monitor 300 enters a third mode of operation (also called "loss signal mode" herein ) when the GPS signals are not obtainable. In this third loss signal mode, GPS receiver 302 attempts to obtain and process the GPS signals at a rate different from that of either the first or second modes. In a particular embodiment, the rate of detection in the third mode is between the rate of detection of the first and second modes, such as once every 15 seconds. In another embodiment, the rate of detection in the third mode is lower than the rate of detection in the first mode, such as once every 45 seconds. In these various embodiments, portable monitor 300 exits the third mode and enters the second mode upon reacquiring the GPS signals to enable it to ascertain its location.

In certain embodiments, portable monitor 300 operates in a particular mode based upon the speed at which the portable monitor (i.e., the panelist carrying the portable monitor) is traveling. Since speed of travel is the amount of distance traveled over a certain amount of time, portable monitor 300 ascertains its speed utilizing its known current position, its previously ascertained position, and the time difference between these two positions. When portable monitor 300 is traveling at a relatively high speed, e.g., greater than 10 miles per hour, portable monitor 300 remains in the first mode (also called "high travel speed mode" in certain embodiments). In this first mode, the GPS signals are obtained at a relatively slow rate, e.g., every 30 seconds. When portable monitor 300 ascertains that it is traveling at a relatively slow speed, e.g., less than 10 miles per hour, then the portable monitor operates in the second mode (also called "low travel speed mode" in certain embodiments). In this second mode, the portable monitor's location is ascertained at a relatively high rate, e.g., every 2 seconds.

When portable monitor 300 operates in the high travel speed mode (i.e., the first mode), the panelist is likely traveling within or on a motorized vehicle. In this mode, exposure to advertisements are tracked and records are created for each exposure. When portable monitor 300 operates in the low travel speed mode (i.e., the second mode), the panelist is likely walking or within or on a vehicle that is idling or moving very slowly. In this second mode, both exposure to advertisements and visits to commercial establishment are tracked. In particular, portable monitor 300 tracks each time the panelist comes near any venue of interest in the portable monitor's storage when operating in the second mode; whereas in the first mode only advertisement exposure is tracked.

In certain embodiments, portable monitor 300 ascertains its speed of travel by communicating with the panelist's motorized vehicle's speedometer. In such embodiments, the vehicle is adapted to provide a velocity signal which is received by the portable monitor via a wire or via wireless technology, such as by radio frequency, infra-red or other wireless technique.

In certain embodiments, storage 306a includes for each or selected venues of interest classification data identifying a classification of the respective venue of interest. In a particular embodiment, the classification data identifies whether the venue of interest is or is not viewable at relatively high speeds of travel (e.g., greater than 10 miles per hour). When portable monitor 300 operates in the high travel speed mode (i.e., the first mode mentioned above in certain embodiments), exposure only to venues of interest viewable at the relatively high predetermined speed of travel (as indicated by the classification data) are tracked and records are created for each exposure. On the other hand, when portable monitor 300 operates in the low travel speed mode (i.e., the second mode), then all exposures are tracked, including exposure to advertisements with either classification and visits to commercial establishments.

Examples of advertisements classified to not be viewable at relatively high speeds of travel may include advertisements with particular physical attributes such as being located on walkways, bus stops and other pedestrian areas, and advertisements with small sized text and/or small images generally not perceivable at high travel speeds, among other advertisements not well suited for viewing at higher travel speeds. Audio advertisements likewise would include such classification since they are generally suitable only for pedestrians and sometimes for occupants of vehicles traveling at a slow speed or idling (e.g., audio messages at traffic signals). In certain embodiments, the classification data identifies the particular range of speed of travel at which the venue of interest is viewable. For example, one venue of interest, such as a small sign, contains classification data that identifies that it is viewable only at travel speeds less than 8 miles per hour, and a second venue of interest, such as a mid-sized sign, contains classification data that identifies that it is viewable only at travel speeds less than 20 miles per hour. As another example, a third venue of interest, such as a large billboard is viewable at any travel speed.

In certain embodiments, venues of interest include classification data pertaining to a specific distance at which the venue of interest is viewable. Accordingly, portable monitor 300 selects its mode of operation based upon its proximity to a venue of interest and the distance classification data identified for that venue of interest. In a particular embodiment, storage 306a includes a designated distance (as distance classification data) for each venue of interest. Portable monitor 300 operates in the first slow rate mode when it is further from each venue of interest in storage 306a than the respective distance designated for each venue of interest. Portable monitor 300 switches to the second, high rate mode of operation when it gets closer to a venue of interest than the distance specified for that respective venue of interest.

FIG. 19 shows a portion of an exemplary table 346 in storage 306a and includes an identification for each venue of interest (only several venues of interest shown for illustrative purposes), the location of each venue of interest, and a designated distance (in feet in the example) for each venue of interest. As shown in table 346, and with reference to map 240 shown in FIG. 10, portable monitor 300 is deemed to be "near" commercial establishment 260a when it is within 20 feet of the entrance of commercial establishment 260a. Commercial establishment 260b likewise has a designated distance of 20 feet. Commercial establishments 260e and 260f have designated distances of 40 feet and, thus, portable monitor 300 is deemed to be "near" these commercial establishments when it is within 40 feet of their respective entrances. Commercial establishment 260i has an even further distance of 60 feet specified, so that the portable monitor is deemed to be near commercial establishment 260i when it is within 60 feet of the specified location. Other commercial establishments not shown in table 346 may have the same or different distances. As previously discussed, portable monitor 300 switches from the first mode to the second mode when it ascertains that it is near one of these commercial establishments and, in the second mode, tracks the panelist carrying around the portable monitor at a relatively high rate, such as every 2 seconds.

As shown in map 240 of FIG. 10, commercial establishments are of various sizes and proximity to one another. Certain embodiments discussed herein enable tracking of a panelist's movement in manners that adapt to commercial establishment location, commercial establishment size and proximity to other commercial establishments, as well as other characteristics, including but not limited to, proximity to streets, proximity to residential areas, density of streets within a geographic area, and so on. In the example provided, commercial establishments 260a-260d are relatively small and in close proximity to one another. Commercial establishment 260i is larger and is remote from other commercial establishments. Commercial establishments 260e and 260f likewise are larger but are less remote from other commercial establishments. Certain embodiments set distances accordingly so that the portable monitor operates in the various modes and tracks a panelist's movement efficiently and accurately.

Referring again to table 346 shown in FIG. 19, advertisements 280a and 280b have designated distances of 100 feet, advertisement 280c has a designated distance of 200 feet, and advertisement 280g has a designated distance of 500 feet. The other advertisements are not represented in FIG. 19 and may have the same or different designated distances. As shown in map 240 of FIG. 10, advertisements 280a and 280b are relatively close to various intersections and, thus, may be less visible at further distances. Also, the existence of trees, buildings and other obstructions may limit visibility of these advertisements from further distances. Advertisement 280c may be substantially large and thus visible from the greater distance of 200 feet. Advertisement 280g may be large and visible from the even greater distance of 500 feet. Of course, the distances provided are for illustrative purposes only. In any event, distances for outdoor advertisements may take multiple factors into account, such as their size, general visibility, nearby obstructions, including trees, buildings, etc., proximity and density of adjacent signs and other viewable elements, and other factors.

In certain embodiments, records are created in accordance with the use of designated distances for venues of interest, as described above, and further in accordance with the direction of travel of the panelist carrying the portable monitor and the location from which the venue of interest is viewable (from data in storage 306a for each venue of interest), as already described herein with reference to previously described embodiments. An advertisement with a designated distance of 200 feet is deemed viewed (i.e., a record is created) when the panelist carrying the portable monitor comes within 200 feet of that advertisement and from a direction that panelist can view the advertisement. For example, a west-facing advertisement is viewable by a panelist traveling east who is in the vicinity of the advertisement.

In certain embodiments, a designated distance is specified within storage 306a for one class or type of venue of interest, and a different designated distance is specified for another class or type of venue of interest. For example, a designated distance of 10 feet can be specified for commercial establishments and a designated distance of 100 feet can be specified for outdoor advertisements.

In certain embodiments, records are created in accordance with an ascertained speed of travel, an ascertained direction of travel, and whether a venue of interest is viewable for the ascertained direction. Similar to previously described embodiments, a record is created when the panelist is traveling in a direction at a location from which the advertisement is viewable. However, when the panelist is traveling in a direction at a location from which the advertisement is deemed not viewable, a record still is created if the panelist is traveling at a relatively slow speed (e.g., walking) to account for the possibility that the panelist may have turned around, or may have turned one's head, to see the advertisement while traveling slowly. In this case, the created record is supplemented with additional data to identify direction of travel and speed of travel, or other pertinent data, so that the record reflects, during subsequent analysis, a relatively low likelihood that the advertisement was seen.

Commercial establishments may comprise multiple classes of venues of interest, with each having its own respective designated distance. For example, commercial establishments disposed within a single structure, such as a shopping center or strip mall, may be designated as one class, with stand-alone commercial establishments designated as a different class. Commercial establishments may be categorized by size or by proximity to adjacent commercial establishments. Classification may be determined based upon a single factor or a combination of factors.

Similarly, outdoor advertisements may comprise multiple classes of venues of interest and be based upon a single factor or a combination of factors. Various factors are size, proximity to street(s), height, proximity to other signs, proximity to obstructions, population density (e.g., rural, suburb, urban), type of structure with advertisement (e.g., stand-alone advertisement, mounted to building, etc.). Other factors not mentioned herein may also be taken into account.

In certain embodiments, two distances are specified for each venue of interest. A first "near" designated distance is specified and a second "far" designated distance is specified. For example, commercial establishment 260a may have a first designated distance of 50 feet, and a second designated distance of 10 feet. Portable monitor 300 operates in one of three different modes depending upon whether the panelist carrying the portable monitor is more than 50 feet (the far distance) from the venue of interest (commercial establishment 260a), between 10 and 50 feet from the venue of interest, or within 10 feet from the venue of interest.

When portable monitor 300 is further away from each venue of interest by more than the respective "far" distance specified for each of venue of interest, then portable monitor 300 operates in a "far" mode in which GPS receiver 302 receives the GPS signals at a relatively slow rate, such as once every 60 seconds. When portable monitor 300 is disposed from a venue of interest by a distance that is between that the designated near and far distances, then portable monitor 300 operates in a "medium" mode. In the medium mode, GPS receiver 302 receives the GPS signals at a rate that is quicker than the relatively slow rate, such as once every 10 seconds. When portable monitor 300 is closer to a venue of interest than that specified by the "near" distance, then portable monitor operates in a "near" mode in which GPS receiver 302 receives the GPS signals at a relatively fast rate, such as once each second. It is noted that various other terms may be used to designate the different modes specified.

In operation, portable monitor 300 initially operates in the far mode, receiving and processing the GPS signals at a relatively slow rate. As the panelist carrying around portable monitor 300 travels closer to any one of the venues of interest stored within the portable monitor's storage, portable monitor 300 switches to its medium mode of operation, in which it receives and processes the GPS signals at a quicker rate. As the panelist travels relatively close to a venue of interest, where such distance is specified in storage, portable monitor 300 switches to its near mode of operation which results in its rapid operation of ascertaining positions at fast rate. In certain embodiments, one or more records are created only when portable monitor 300 operates in the near mode, in a manner similar to how it creates a record in mode two in various other embodiments described herein. In certain other embodiments, one or more records are created also when portable monitor 300 operates in the medium mode.

In certain embodiments, venues of interest have different numbers of distances specified. In a particular embodiment, near and far distances are stored for each commercial establishment, but only a single distance is stored for each outdoor advertisement.

In another embodiment, select venues of interest have three designated distances and other venues of interest have two designated distances. Thus, four modes of operation exist where three distances are specified for a venue of interest. Other numbers of distances may be specified.

In certain embodiments, different modes of operation ascertain the position of portable monitor 300 to different degrees of accuracy. Thus, a mode of operation in which portable monitor 300 is closer to a venue of interest results in ascertaining the position to a higher degree of accuracy as compared to another mode of operation in which portable monitor 300 is further away from that venue of interest. In certain instances, power consumption is reduced when the portable monitor ascertains its position at a relatively low degree of accuracy. Utilizing differential GPS or other known methods and devices provide different degrees of accuracy.

In certain embodiments, portable monitor 300 further ascertains the panelist's direction of travel based upon the panelist's ascertained movements. When portable monitor 300 is unable to receive the GPS signals (for convenience, inability to receive the GPS signals is sometimes referred to herein as being "lost"), the commercial establishment that the panelist entered is ascertained based upon the panelist's direction of travel at the time the GPS signals were lost. In a particular embodiment, direction of travel is derived by assessing the path of travel prior to loss of the GPS signals. In certain other embodiments, direction of travel is ascertained using one or more devices suitable for ascertaining direction, such as a gyroscope or other appropriate device. Various embodiments are particularly useful for crowded areas, where commercial establishments have entrances very close to one another.

Figure 20:
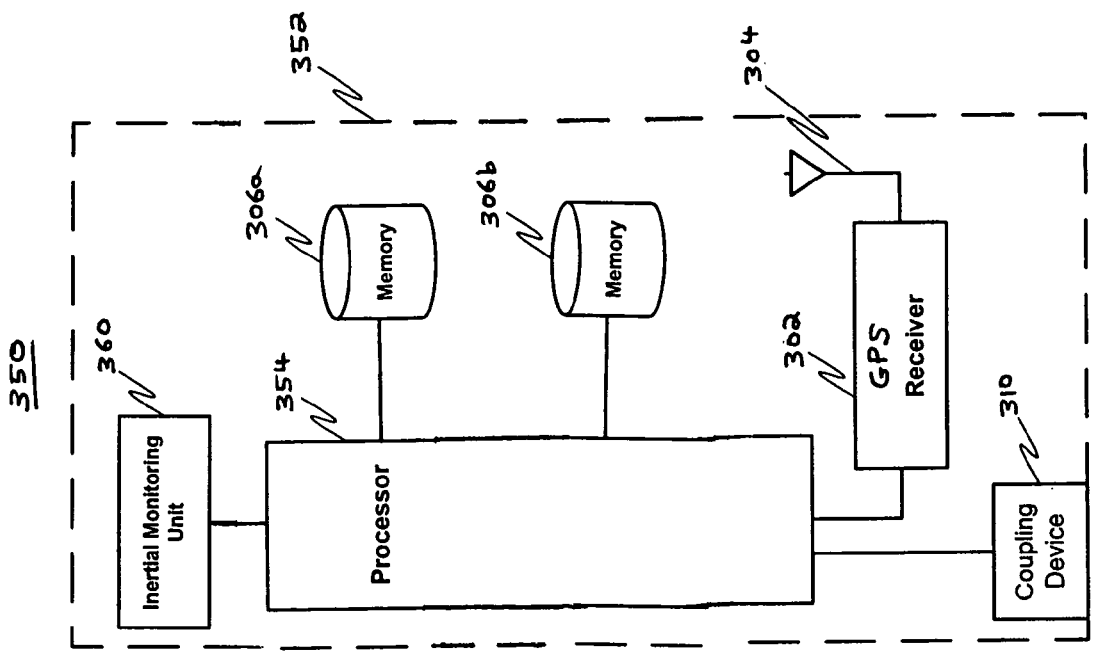
FIG. 20 provides a block diagram of a portable monitor utilizing an inertial monitoring unit in accordance with an embodiment of the invention.

In certain other embodiments, the portable monitor ascertains its location utilizing inertial monitoring. Referring to FIG. 20, a portable monitor 350 is illustrated in block form and elements corresponding to those of FIG. 11 bear the same reference numerals. Similar to that shown in FIG. 11, portable monitor 350 includes an RF receiver 302, an antenna 304, storages 306a and 306b, a coupling device 310, and a processor 354, all contained within an enclosure 352. Portable monitor 350 receives one or more signals from one or more terrestrial sources and/or satellite sources, and generates data indicative of a location of the portable monitor 350. In certain embodiments, the signals used for this purpose are obtained from a cellular telephone system, Wi-Fi access points, Bluetooth devices, or from a GPS or assisted GPS receiver, as previously described.

The portable monitor 350 shown in FIG. 20 also includes an inertial monitoring unit 360 which supplies location data to processor 354. The unit 360 is calibrated based on the data output by receiver 302. Calibration may be performed periodically or from time to time, or whenever the signals from the terrestrial and/or satellite sources are received. Calibration signals may be transmitted by a calibration transmitter 86, as shown in FIG. 9, or other appropriate device. In certain embodiments, a calibration transmitter or transmitters are located in close proximities to retail establishments, as previously discussed. In certain embodiments, the calibration signals are obtained by reference to a database kept in the storage of monitor 350, such as the database developed by Place Lab (identified hereinabove).

In certain embodiments, the inertial monitoring device employs microelectromechanical sensors (MEMS) as either gyroscopic sensors and/or accelerometers to provide data from which the location of the monitor can be determined. In certain embodiments, calibration employs terrestrial techniques, such as an angle of arrival (AOA) technique, a time difference of arrival (TDOA) technique, an enhanced signal strength (ESS) technique, a location fingerprinting technique, and/or an ultra wideband location technique.

In still other embodiments, the location data is produced directly based on terrestrial techniques, such as an angle of arrival (AOA) technique, a time difference of arrival (TDOA) technique, an enhanced signal strength (ESS) technique, a location fingerprinting technique, or an ultra wideband location technique. In certain embodiments, the location data is produced by detecting proximity to a device or devices transmitting identification signals identifying the device or devices or directly identifying the location. The received data is used in certain ones of such embodiments to perform a location data lookup in a database, such as the Place Lab database.

Figure 21:
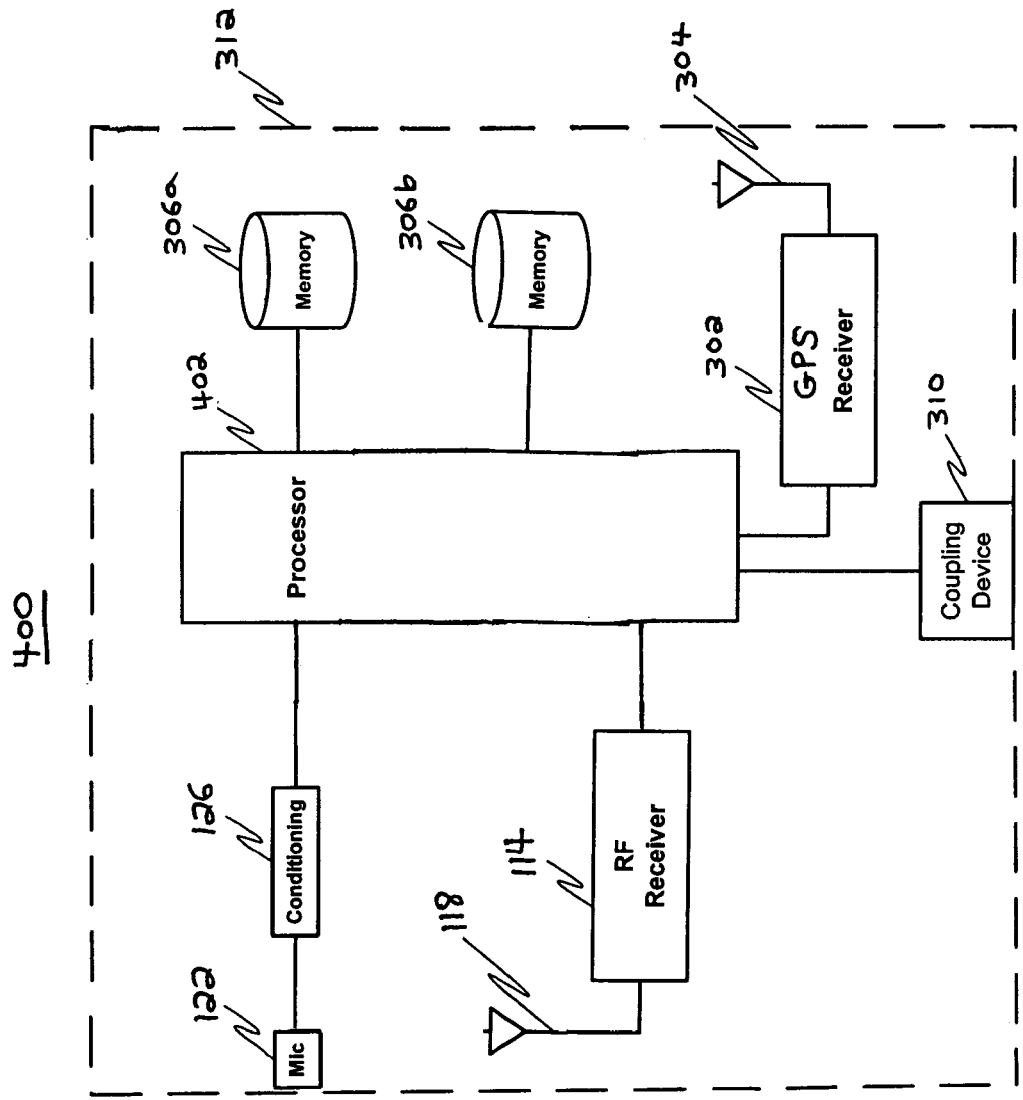
FIG. 21 provides a block diagram of a portable monitor capable of tracking movement both outside and inside a retail establishment in accordance with certain embodiments of the invention.

In certain embodiments, the portable monitor tracks the exterior movement (i.e., outside a retail establishment) of a panelist carrying the portable monitor, as previously discussed, and further tracks the movement of the panelist inside a retail establishment. FIG. 21 shows a block diagram of an embodiment of a portable monitor 400 capable of tracking movement of a panelist both outside and inside a retail establishment employing multiple technologies. In FIG. 21, elements corresponding to those in FIG. 5 and to those of FIG. 11 bear the same reference numerals. In certain embodiments, RF Receiver 114 is capable of communicating using a WiFi or other wireless networking protocol.

In certain embodiments, outside movement is tracked by ascertaining the panelist's location by receiving and processing one or more GPS signals (or A-GPS or other previously discussed technologies), as previously discussed. When the panelist enters a retail establishment, the GPS signals are no longer received and portable monitor 400 immediately enters a mode of operation in which the position of the panelist is tracked by employing another technology. In certain ones of such embodiments, processor 402 serves to detect the data contained in the location signal transmitted in acoustic form and received by microphone 122 and conditioned by conditioning circuit 126. When the location signal is transmitted in another form, the receiver 114 receives the location signal via antenna 118 and supplies the location data to processor 402. In certain ones of such embodiments, location tracking is carried out within a retail establishment in accordance with certain embodiments previously described, such as with reference to any one of FIGS. 1-9.

In a specific embodiment, records are created during external movement of a panelist carrying around the portable monitor in accordance with certain embodiments described, and then, upon entry into a retail establishment, the RF receiver 302 and/or microphone 122 enable the panelist to be tracked inside the retail establishment by maintaining a record of each transmitter identification received inside the retail establishment.

While the panelist's location is tracked inside a retail establishment by employing receiver 114 or microphone 122, GPS receiver 302 is placed in a standby mode or not powered to conserve battery power. GPS receiver 302 remains in this low-power mode while the panelist's location is tracked using a different technology. However, when location information is no longer received continuously for a short period of time, such as 5 seconds, GPS receiver 302 is powered and controlled to receive and process the GPS signals, at which point the location of the portable monitor is re-ascertained. Portable monitor 400 then continues operation utilizing the GPS receiver. During operation of GPS receiver 302, RF receiver 114 is placed in a low-power standby mode or not powered.

As previously discussed, in certain embodiments, upon entering a retail establishment, the GPS signals are lost and portable monitor 400 immediately enters a mode of operation in which the position of the panelist is tracked by employing another technology. However, the retail establishment entered may not be employing a suitable RF transmitter 90 or a suitable audio encoder 120, such as shown in FIG. 5, or other technology to enable tracking inside the retail establishment. In such case, portable monitor 400 is unable to ascertain its location by any means, in which case portable monitor 400 periodically attempts to acquire the GPS signals as in the case of certain other embodiments previously described. However, in other embodiments, a further location technique is employed which does not require the use of devices such as transmitter 90 or audio encoder 120. These embodiments utilize terrestrial techniques such as a location database lookup technique using cellular telephone signals, Wi-Fi access point signals, Bluetooth signals and the like. Still other available terrestrial location techniques are employed in certain embodiments for the purpose of indoor tracking, such as AOA, TDOA, ESS, location fingerprinting or ultra wideband techniques utilizing available signals.

In certain embodiments, portable monitor 400 operates in multiple GPS modes that correspond to the multiple modes described in various embodiments discussed in connection with FIG. 11.

In certain previously discussed embodiments, venue of interest data are stored within the portable monitor's internal storage. This data, however, may be stored elsewhere and periodically transmitted to the portable monitor. In certain embodiments, the venue of interest data are stored within one or more external databases and data pertaining to particular venues of interest are transmitted to the portable monitor based upon the portable monitor's location. The portable monitor receives the transmitted venue of interest data utilizing its RF receiver or other suitable receiver and stores the received data within its storage (e.g., storage 306a shown in FIG. 11).

Figure 22:
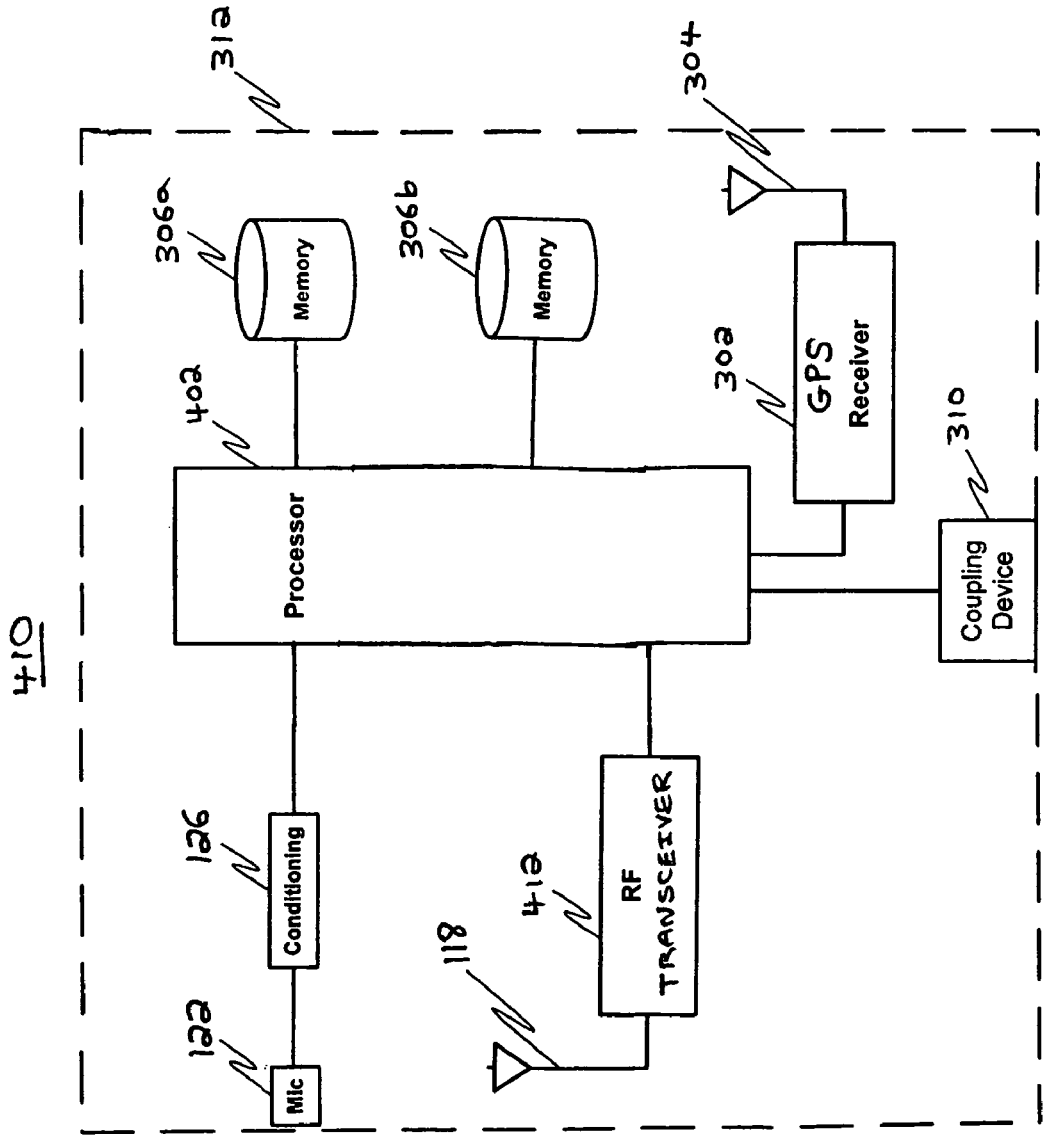
FIG. 22 provides another block diagram of a portable monitor capable of tracking movement in accordance with certain embodiments of the invention.

In a particular embodiment, venue of interest data containing data about venues of interest disposed within a certain geographic location (e.g., a town, village, etc.) are transmitted to and received by the portable monitor when it is disposed in or near that certain geographic location. When the panelist carrying the portable monitor visits another geographic location, the portable monitor transmits, using an RF transceiver, data to a receiving base station indicative of its location and, in response, the base station transmits to the portable monitor venue of interest data pertaining to the new geographic location. The newly transmitted venue of interest data is stored within the portable monitor, replacing previously stored venue of interest data. FIG. 22 shows a block diagram of an embodiment of a portable monitor 410, capable of communicating with a base station, via RF transceiver 412, to receive new venue of interest data. In FIG. 22, elements corresponding to those in previously described embodiments bear the same reference numerals. The portable monitor's storage capacity thus does not limit the portable monitor's capability of tracking a panelist in the multitudes of streets, towns, cities, etc., that may be visited by that panelist during the panel study.

In certain embodiments, the portable monitor does not store venue of interest data and maintains a record of a panelist's travel patterns. The stored travel pattern is downloaded from the portable monitor via coupling device 136 in accordance with the various manners previously discussed. The centralized processor 166 receives the downloaded travel pattern data and utilizing known venue of interest data establishes records of commercial establishments visited and advertisements viewed. In certain embodiments, the portable monitor periodically transmits, throughout the panelist's usage of the monitor (e.g., throughout a day), the stored panelist's travel patterns to a base station, for further processing.

In certain embodiments, the portable monitor operates in a different manner or in a different mode, or carries out a function (e.g., creates or modifies a record), depending upon whether it is able to or unable to receive the GPS signals necessary for the portable monitor to ascertain its current location. In certain ones of these embodiments, a "mode" change or other action is not carried out immediately upon the initial "loss" of (i.e., inability to acquire) the GPS signals, but rather, one or more verification attempts to reacquire the GPS signals are made before switching modes or carrying out an action. Thereafter, upon verifying that the GPS signals cannot be obtained, the appropriate mode change or action is carried in certain ones of the various embodiments described.

Although various embodiments of the present invention have been described with reference to a particular arrangement of parts, features and the like, these are not intended to exhaust all possible arrangements or features, and indeed many other embodiments, modifications and variations will be ascertainable to those of skill in the art.

What is claimed is:

1. A portable monitor for use in a market research study for monitoring travel and retail establishment visiting patterns of participants in the market research study, comprising:

a wireless receiver operative to receive one or more position signals from one or more satellite sources and to supply position data corresponding to the one or more position signals;

storage operative to store venue of interest data representing locations of venues of interest pertinent to the market research study; and a processor operative to process the position data to ascertain a current location of the portable monitor, to assess whether the portable monitor is within a predetermined proximity to at least one of the venues of interest based upon the ascertained current location of the portable monitor and the venue of interest data stored in the storage, and to generate, when the processor assesses that the portable monitor is within the predetermined proximity to said at least one of the venues of interest, a record including data representative of the respective venue of interest and time data representative of a time at which the portable monitor is within the predetermined proximity to the respective venue of interest, the processor further being operative, after the processor assesses that the portable monitor is within the predetermined proximity to said at least one of the venues of interest, to ascertain that the portable monitor enters the respective venue of interest when the wireless receiver does not receive one or more position signals sufficient to enable the processor to ascertain the current location of the portable monitor, and to ascertain an amount of time the portable monitor remains outside but within the predetermined proximity to the respective venue of interest by utilizing an amount of time the wireless receiver continues to receive one or more position signals sufficient to enable the processor to ascertain the current location of the portable monitor.

2. The portable monitor of claim 1, wherein the storage is operative to store venue of interest data representing locations of entrances of retail establishments pertinent to the market research study.

3. The portable monitor of claim 1, wherein the storage is operative to store venue of interest data representing locations of outdoor advertisements pertinent to the market research study.

4. The portable monitor of claim 1, wherein the storage is operative to store venue of interest data representative of both locations of entrances of retail establishments pertinent to the market research study and locations of outdoor advertisements pertinent to the market research study.

5. The portable monitor of claim 1, wherein the processor is operative to ascertain a time when the portable monitor enters the respective venue of interest, and the record generated corresponding to the respective venue of interest includes time entry data representative of the ascertained time.

6. The portable monitor of claim 1, wherein the processor is operative to ascertain an amount of time the portable monitor is disposed within the respective venue of interest, and the record generated corresponding to the respective venue of interest includes duration of visit data representative of the ascertained amount of time.

7. The portable monitor of claim 6, wherein the processor is operative to ascertain the amount of time the portable monitor is disposed within the respective venue of interest by utilizing an amount of time the wireless receiver does not receive one or more position signals sufficient to enable the processor to ascertain the current location of the portable monitor.

8. The portable monitor of claim 1, wherein the processor is operative to ascertain a departure time when the portable monitor departs the respective venue of interest, and the record generated corresponding to the respective venue of interest includes data representative of the ascertained departure time.

9. The portable monitor of claim 1, wherein the processor is operative to ascertain an amount of time the portable monitor remains outside but within the predetermined proximity to the respective venue of interest, and the record generated corresponding to the respective venue of interest includes time data representative of the ascertained time amount of time the portable monitor remains outside but within the predetermined proximity to the respective venue of interest.

10. The portable monitor of claim 1, wherein the processor is operative to control the wireless receiver to function so that the wireless receiver supplies position data that enables the processor to ascertain the current location of the portable monitor to a first degree of accuracy when the portable monitor is not within the predetermined proximity to any of the venues of interest, and to control the wireless receiver to function so that the wireless receiver supplies position data that enables the processor to ascertain the current location of the portable monitor to a second degree of accuracy when the portable monitor is within the predetermined proximity to at least one of the venues of interest, the second degree of accuracy being substantially higher than the first degree of accuracy.

11. The portable monitor of claim 1, further comprising an inertial monitoring unit for calibrating the location ascertained by the processor.

12. The portable monitor of claim 1, further comprising a receiver adapted to receive new venue of interest data representing locations of venues of interest during use of the portable monitor by a participant in the market research study, the new venue of interest data being substantially different from the venue of interest data stored in the storage; and wherein the storage is operative to replace previously stored venue of interest data with the new venue of interest data received by the receiver.

13. The portable monitor of claim 1, further comprising an output device operative to download data representative of each generated record to a market research company for subsequent generation of reports relating to the travel patterns of the participants in the market research study.

14. A method for monitoring travel and retail establishment visiting patterns of participants in a market research study, comprising:

providing a portable monitor to each of a plurality of participants in the market research study, the portable monitor adapted to be carried on the person of one of the participants, and containing a wireless receiver operative to receive one or more position signals from one or more satellite sources, and containing a storage operative to store venue of interest data representing locations of venues of interest pertinent to the market research study;

ascertaining a current location of the portable monitor based upon the received one or more position signals;

assessing whether the portable monitor is within a predetermined proximity to at least one of the venues of interest represented by the venue of interest data;

generating a record including data representative of the respective venue of interest to which the portable monitor is disposed within the predetermined proximity and time data representative of a time when the portable monitor is assessed to be disposed within the predetermined proximity of the respective venue of interest;

ascertaining, after assessing that the portable monitor is within the predetermined proximity to said at least one of the venues of interest, that the portable monitor enters the respective venue of interest when the wireless receiver does not receive one or more position signals sufficient to enable the processor to ascertain the current location of the portable monitor; and ascertaining, after assessing that the portable monitor is within the predetermined proximity to said at least one of the venues of interest, an amount of time the portable monitor remains outside but within the predetermined proximity to the respective venue of interest by utilizing an amount of time the wireless receiver continues to receive one or more position signals sufficient to ascertain the current location of the portable monitor.

15. The method of claim 14, wherein the assessing step is carried out by ascertaining a time when the portable monitor enters a retail establishment represented by one of the venues of interest, and the generating step is carried out by generating a record including data representative of the entered retail establishment and time data representative of the ascertained time when the portable monitor entered the retail establishment.

16. The method of claim 14, further comprising ascertaining a direction of travel of the portable monitor, and ascertaining that the portable monitor entered a retail establishment represented by one of the venues of interest based upon the ascertained direction of travel, the ascertained current location of the portable monitor and the location of the retail establishment.

17. The method of claim 14, further comprising ascertaining an amount of time the portable monitor is disposed within a retail establishment represented by one of the venues of interest, and the generated record includes duration of visit data representative of the ascertained amount of time.

18. The method of claim 17, wherein the ascertaining an amount of time step includes utilizing an amount of time the wireless receiver does not receive one or more position signals necessary to ascertain the current location of the portable monitor.

19. The method of claim 14, wherein the ascertaining step is carried out by ascertaining the current location of the portable monitor to a first degree of accuracy when the portable monitor is not within the predetermined proximity to any of the venues of interest, and ascertaining the current location of the portable monitor to a second degree of accuracy when the portable monitor is within the predetermined proximity to at least one of the venues of interest, the second degree of accuracy being substantially higher than the first degree of accuracy.

20. The method of claim 14, further comprising calibrating the ascertained current location using an inertial monitoring unit within the portable monitor.

21. The method of claim 14, further comprising receiving by the portable monitor, during use by a participant in the market research study, new venue of interest data representing locations of venues of interest, the new venue of interest data being substantially different from the venue of interest data stored in the storage; and replacing by the portable monitor the venue of interest data in the storage with the new venue of interest data.

22. The method of claim 14, further comprising the steps of downloading data representative of each generated record from the portable monitor to a market research company; and generating from the downloaded data one or more reports relating to the travel patterns of the participants in the market research study.

23. A portable monitor for use in a market research study for monitoring retail establishment visiting patterns of participants in the market research study, comprising:

a wireless receiver operative to receive one or more position signals and to supply position data corresponding to the one or more position signals; and a processor operative to process the position data to ascertain a current location of the portable monitor, to assess whether the portable monitor is within a predetermined proximity to at least one of a plurality of retail establishments pertinent to the market research study, and to generate a record of a visit to the retail establishment if the wireless receiver is unable to receive position signals sufficient to enable the processor to ascertain the current location of the portable monitor after the processor assesses that the portable monitor is within the predetermined proximity to the retail establishment, the generated record including data representative of the retail establishment and time data representing a time the portable monitor entered the retail establishment.

24. The portable monitor of claim 23, wherein the processor is further operative to ascertain an amount of time the portable monitor is disposed within the retail establishment based upon an amount of time the wireless receiver is unable to receive one or more position signals sufficient to enable the processor to ascertain the current location of the portable monitor, and the generated record includes data representative of the ascertained amount of time.

25. The portable monitor of claim 23, wherein the processor is operative to ascertain a direction of travel of the portable monitor, and is operative to ascertain a retail establishment to which the portable monitor entered in accordance with the ascertained direction of travel of the portable monitor when the wireless receiver is unable to receive one or more position signals sufficient to enable the processor to ascertain the current location of the portable monitor.

26. The portable monitor of claim 23, further comprising storage operative to store venue of interest data representing locations of the retail establishments pertinent to the market research study; and wherein the processor is operative to assess whether the portable monitor is within a predetermined proximity to at least one of the retail establishments based upon the ascertained current location of the portable monitor and the venue of interest data stored in the storage.

27. A portable monitor for use in a market research study for monitoring travel and retail establishment visiting patterns of participants in the market research study, comprising:

a wireless receiver operatively controlled to receive one or more position signals and to supply position data corresponding to the one or more position signals;

storage operative to store venue of interest data representing locations of venues of interest pertinent to the market research study;

a processor operative to process the position data to ascertain a current location of the portable monitor, to assess whether the portable monitor is within a predetermined proximity to at least one of the venues of interest based upon the ascertained current location of the portable monitor and the venue of interest data, to operate the wireless receiver in a first mode of operation to receive said one or more position signals at a first rate when the processor assesses that the portable monitor is not within the predetermined proximity to any of the venues of interest, and to operate the wireless receiver in a second mode of operation to receive said one or more position signals at a second rate substantially higher than the first rate when the processor assesses that the portable monitor is within the predetermined proximity to at least one of the venues of interest, and to generate, when the processor assesses that the portable monitor is within the predetermined proximity to at least one of the venues of interest, a record including data representative of the respective venue of interest to which the portable monitor is within the predetermined proximity and time data representative of a time when the portable monitor is within the predetermined proximity to the respective venue of interest.

28. A portable monitor for use in a market research study for monitoring travel and retail establishment visiting patterns of participants in the market research study, comprising:
a wireless receiver operatively controlled to receive one or more position signals and to supply position data corresponding to the one or more position signals;
storage operative to store venue of interest data representing locations of venues of interest pertinent to the market research study;
a processor operative to control the wireless receiver to receive said one or more position signals at a first rate in a first mode of operation, to control the wireless receiver to receive said one or more position signals at a second rate in a second mode of operation, the second rate being substantially higher than the first rate, to process the position data to ascertain a current location of the portable monitor, and wherein the processor is further operative to control the wireless receiver to receive said one or more position signals at a third rate while the wireless receiver is unable to supply position data that enables the processor to ascertain the current location of the portable monitor;
the processor being operative to assess whether the portable monitor is within a predetermined proximity to at least one of the venues of interest based upon the ascertained current location of the portable monitor and the venue of interest data, and to generate, when the processor assesses that the portable monitor is within the predetermined proximity to at least one of the venues of interest, a record including data representative of the respective venue of interest to which the portable monitor is within the predetermined proximity and time data representative of a time when the portable monitor is within the predetermined proximity to the respective venue of interest.

29. A portable monitor for use in a market research study for monitoring travel and retail establishment visiting patterns of participants in the market research study, comprising:
a wireless receiver operatively controlled to receive one or more position signals and to supply position data corresponding to the one or more position signals;
storage operative to store venue of interest data representing locations of venues of interest pertinent to the market research study;
a processor operative to ascertain a current speed of travel of the portable monitor, to control the wireless receiver to receive said one or more position signals at a first rate in a first mode of operation when the ascertained current speed of travel is greater than a predetermined speed, and to control the wireless receiver to receive said one or more position signals at a second rate substantially higher than the first rate in a second mode of operation when the ascertained current speed of travel is not greater than the predetermined speed, to process the position data to ascertain a current location of the portable monitor, to assess whether the portable monitor is within a predetermined proximity to at least one of the venues of interest based upon the ascertained current location of the portable monitor and the venue of interest data, and to generate, when the processor assesses that the portable monitor is within the predetermined proximity to at least one of the venues of interest, a record including data representative of the respective venue of interest to which the portable monitor is within the predetermined proximity and time data representative of a time when the portable monitor is within the predetermined proximity to the respective venue of interest.

30. A portable monitor for use in a market research study for monitoring travel and retail establishment visiting patterns of participants in the market research study, comprising:
a wireless receiver operatively controlled to receive one or more position signals and to supply position data corresponding to the one or more position signals;
storage operative to store venue of interest data representing locations of venues of interest pertinent to the market research study and distance data representative of designated distances from each of the venues of interest; and
a processor operative to control the wireless receiver to receive said one or more position signals at a first rate in a first mode of operation when the processor assesses that the portable monitor is further from each of the venues of interest by the respective designated distance as represented by the stored distance data, and is operative to control the wireless receiver to receive said one or more position signals at a second rate substantially higher than the first rate in a second mode of operation when the processor assesses that the portable monitor is not further from at least one of the venues of interest by the respective designated distance, to process the position data to ascertain a current location of the portable monitor, to assess whether the portable monitor is within a predetermined proximity to at least one of the venues of interest based upon the ascertained current location of the portable monitor and the venue of interest data, and to generate, when the processor assesses that the portable monitor is within the predetermined proximity to at least one of the venues of interest, a record including data representative of the respective venue of interest to which the portable monitor is within the predetermined proximity and time data representative of a time when the portable monitor is within the predetermined proximity to the respective venue of interest.

31. A portable monitor for use in a market research study for monitoring travel and retail establishment visiting patterns of participants in the market research study, comprising:
a wireless receiver operatively controlled to receive one or more position signals and to supply position data corresponding to the one or more position signals;
storage operative to store venue of interest data representing locations of venues of interest pertinent to the market research study;
a receiver operative to receive new venue of interest data representing locations of additional venues of interest;
the storage being operative to replace previously stored venue of interest data with the new venue of interest data received by the receiver; and
a processor operative to control the wireless receiver to receive said one or more position signals at a first rate in a first mode of operation, and to control the wireless receiver to receive said one or more position signals at a second rate in a second mode of operation, the second rate being substantially higher than the first rate, to process the position data to ascertain a current location of the portable monitor, to assess whether the portable monitor is within a predetermined proximity to at least one of the venues of interest based upon the ascertained current location of the portable monitor and the venue of interest data, and to generate, when the processor assesses that the portable monitor is within the predetermined proximity to at least one of the venues of interest, a record including data representative of the respective venue of interest to which the portable monitor is within the predetermined proximity and time data representative of a time when the portable monitor is within the predetermined proximity to the respective venue of interest.

32. A method for monitoring travel and retail establishment visiting patterns of participants in a market research study, comprising:
providing a portable monitor to each of a plurality of participants in the market research study, the portable monitor adapted to be carried on the person of one of the participants, and containing a wireless receiver operative to receive one or more position signals at a selected one of a first rate and a second rate, the second rate being substantially higher than the first rate, the portable monitor containing a storage operative to store venue of interest data representing locations of venues of interest pertinent to the market research study;
receiving by the wireless receiver one or more position signals;
ascertaining a current location of the portable monitor based upon the received one or more position signals;
assessing whether the ascertained current location is within a predetermined proximity to at least one of the venues of interest represented by the venue of interest data;
selecting the first rate of the wireless receiver when the portable monitor is not within the predetermined proximity to any of the venues of interest, and selecting the second rate of the wireless receiver when the portable monitor is within the predetermined proximity to at least one of the venues of interest;
generating a record including data representative of the respective venue of interest that the portable monitor is assessed to be within the predetermined proximity and time data representative of a time at which the portable monitor is within the predetermined proximity to the respective venue of interest.

33. A method for monitoring travel and retail establishment visiting patterns of participants in a market research study, comprising:
providing a portable monitor to each of a plurality of participants in the market research study, the portable monitor adapted to be carried on the person of one of the participants, and containing a wireless receiver operative to receive one or more position signals at a selected one of a first rate and a second rate, the second rate being substantially higher than the first rate, the portable monitor containing a storage operative to store venue of interest data representing locations of venues of interest pertinent to the market research study;
operating the wireless receiver to receive one or more position signals;
ascertaining a current location of the portable monitor based upon the received one or more position signals;
selecting a rate of operation of the wireless receiver, the rate being selected from at least one of a first rate, a second rate, and a third rate substantially different from the first and second rates, the second rate being substantially higher than the first rate, comprising selecting the third rate when the wireless receiver is unable to receive position signals necessary to ascertain the current location of the portable monitor;
assessing whether the ascertained current location is within a predetermined proximity to at least one of the venues of interest represented by the venue of interest data;
generating a record including data representative of the respective venue of interest that the portable monitor is assessed to be within the predetermined proximity and time data representative of a time at which the portable monitor is within the predetermined proximity to the respective venue of interest.

34. A method for monitoring travel and retail establishment visiting patterns of participants in a market research study, comprising:
providing a portable monitor to each of a plurality of participants in the market research study, the portable monitor adapted to be carried on the person of one of the participants, and containing a wireless receiver operative to receive one or more position signals at a selected one of a first rate and a second rate, the second rate being substantially higher than the first rate, the portable monitor containing a storage operative to store venue of interest data representing locations of venues of interest pertinent to the market research study;
ascertaining a current speed of travel of the portable monitor;
selecting the first rate of operation of the wireless receiver when the ascertained current speed of travel is greater than a predetermined speed, and selecting the second rate when the ascertained current speed of travel is not greater than the predetermined speed;
receiving by the wireless receiver one or more position signals at the selected rate of operation;
ascertaining a current location of the portable monitor based upon the received one or more position signals;
assessing whether the ascertained current location is within a predetermined proximity to at least one of the venues of interest represented by the venue of interest data;
generating a record including data representative of the respective venue of interest that the portable monitor is assessed to be within the predetermined proximity and time data representative of a time at which the portable monitor is within the predetermined proximity to the respective venue of interest.

35. A method for monitoring travel and retail establishment visiting patterns of participants in a market research study, comprising:
providing a portable monitor to each of a plurality of participants in the market research study, the portable monitor adapted to be carried on the person of one of the participants, and containing a wireless receiver operative to receive one or more position signals at a selectable rate of operation, and containing a storage operative to store venue of interest data representing locations of venues of interest pertinent to the market research study;
selecting the rate of operation of the wireless receiver, the rate being selected from at least one of a first rate and a second rate, the second rate being substantially higher than the first rate;
receiving by the wireless receiver one or more position signals at the selected rate of operation;
ascertaining a current location of the portable monitor based upon the received one or more position signals;
assessing whether the ascertained current location is within a predetermined proximity to at least one of the venues of interest represented by the venue of interest data;

generating a record including data representative of the respective venue of interest that the portable monitor is assessed to be within the predetermined proximity and time data representative of a time at which the portable monitor is within the predetermined proximity to the respective venue of interest;

receiving by the portable monitor new venue of interest data representing locations of additional venues of interest; and replacing by the portable monitor previously stored venue of interest data with the new venue of interest data.

36. A portable monitor for use in a market research study for monitoring retail establishment visiting patterns of participants in the market research study, comprising:
   a first wireless receiver operative to receive one or more position signals of a first type and to supply first position data corresponding to the one or more position signals of the first type;
   a second wireless receiver operative to receive one or more position signals of a second type and to supply second position data corresponding to the one or more position signals of the second type, the first type and the second type being different;
   a processor operative to process the first position data to ascertain a current location of the portable monitor, to assess whether the portable monitor is within a predetermined proximity to at least one of a plurality of retail establishments pertinent to the market research study, to generate a record of a visit to the retail establishment if the first wireless receiver is unable to supply first position data sufficient to enable the processor to ascertain the current location of the portable monitor after the processor assesses that the portable monitor is within the predetermined proximity to the retail establishment, and to track movement of the portable monitor in accordance with the second position data if the first wireless receiver is unable to supply first position data sufficient to enable the processor to ascertain the current location of the portable monitor.

37. The portable monitor of claim 36, wherein the first wireless receiver is operative to receive one or more position signals of a type that cannot substantially be received within establishments of certain types, and the second wireless receiver is operative to receive one or more position signals of a type that can substantially be received within establishments of said certain types.

38. The portable monitor of claim 36, wherein the first wireless receiver is operative to receive one or more position signals from one or more satellite sources, and the second wireless receiver is operative to receive one or more position signals from one or more terrestrial sources.

39. The portable monitor of claim 36, wherein the processor is operative to track movement of the portable monitor in accordance with the second position data if the processor ascertains that the portable monitor is within one of the retail establishments represented by the stored venue of interest data.

40. The portable monitor of claim 39, wherein the processor is operative to generate a record of the portable monitor coming in close proximity to a consumer product represented by said one or more position signals received by the second wireless receiver.

41. The portable monitor of claim 40, wherein the generated record includes a length of time the portable monitor is in close proximity to the consumer product represented by said one or more position signals received by the second wireless receiver.

42. The portable monitor of claim 39, wherein the processor is operative to generate a record of the portable monitor coming within a predetermined proximity to an advertisement inside said one of the retail establishments, the advertisement corresponding to said one or more position signals received by the second wireless receiver.

43. The portable monitor of claim 39, further comprising storage operative to store venue of interest data representing locations of the retail establishments pertinent to the market research study; and wherein the processor is operative to assess whether the portable monitor is within a predetermined proximity to at least one of the retail establishments based upon the ascertained current location of the portable monitor and the venue of interest data stored in the storage.

44. A method for monitoring travel and retail establishment visiting patterns of participants in a market research study, comprising:
   providing a portable monitor to each of a plurality of participants in the market research study, the portable monitor adapted to be carried on the person of one of the participants, the portable monitor containing a first wireless receiver operative to receive one or more position signals of a first type, and a second wireless receiver operative to receive one or more position signals of a second type, the first type and the second type being different;
   receiving by the first wireless receiver one or more position signals of the first type;
   ascertaining a current location of the portable monitor based upon the received one or more position signals of the first type;
   assessing whether the portable monitor is within a predetermined proximity to at least one of a plurality of retail establishments pertinent to the market research study;
   generating a record of a visit to the retail establishment if, after assessing that the portable monitor is within the predetermined proximity to a retail establishment, the first wireless receiver in the portable monitor is unable to receive one or more position signals of the first type sufficient for the assessing step to ascertain the current location of the portable monitor;
   receiving by the second wireless receiver one or more position signals of the second type when the first wireless receiver in the portable monitor is unable to receive one or more position signals of the first type sufficient for the assessing step to ascertain the current location of the portable monitor; and
   tracking movement of the portable monitor in accordance with the one or more position signals of the second type received by the second wireless receiver.

45. The method of claim 44, wherein the step of receiving by the first wireless receiver is carried out by receiving one or more position signals of a type that cannot substantially be received within establishments of certain types; and the step of receiving by the second wireless receiver is carried out by receiving one or more position signals of a type that can substantially be received within establishments of said certain types.

46. The method of claim 44, wherein the step of receiving by the first wireless receiver is carried out by receiving one or more position signals from one or more satellite sources, and the step of receiving by the second wireless receiver is carried out by receiving one or more position signals from one or more terrestrial sources.

47. The method of claim 44, wherein the portable monitor provided to each of the participants in the market research study includes storage operative to store venue of interest data representing locations of the retail establishments pertinent to the market research study; and the step of assessing whether the portable monitor is within the predetermined proximity to at least one of the retail establishments is carried out by utilizing the ascertained current location of the portable monitor and the venue of interest data stored in the storage.

48. The method of claim 47, wherein the step of tracking movement of the portable monitor is carried out when the portable monitor is within one of the retail establishments represented by the stored venue of interest data.

49. The method of claim 48, wherein the step of tracking movement of the portable monitor includes generating a record of the portable monitor coming in close proximity to a consumer product represented by said one or more position signals of the second type received by the second wireless receiver.

50. The method of claim 49, further comprising ascertaining a length of time the portable monitor is in close proximity to the consumer product represented by said one or more position signals of the second type received by the second wireless receiver, and the generated record includes the ascertained length of time.

51. The method of claim 48, wherein the step of tracking movement of the portable monitor includes generating a record of the portable monitor coming within a predetermined proximity to an advertisement inside said one of the retail establishments, the advertisement being represented by said one or more position signals of the second type received by the second wireless receiver.

52. A portable monitor for use in a market research study for monitoring travel patterns of participants in the market research study, comprising:
 a wireless receiver operative to receive one or more position signals and to supply position data corresponding to the one or more position signals;
 storage operative to store venue of interest data pertaining to venues of interest pertinent to the market research study, each venue of interest representing a visually viewable advertisement, the venue of interest data including for at least selected ones of each venue of interest physical attribute data identifying a physical attribute of the visually viewable advertisement represented by the respective venue of interest;
 a processor operative:
  to process the position data to ascertain a current location of the portable monitor,
  to ascertain a portable monitor movement characteristic pertaining to movement of the portable monitor,
  to assess whether the portable monitor is within a predetermined proximity to one of the venues of interest;
  to determine whether the ascertained portable monitor movement characteristic corresponds to the physical attribute data of said one of the venues of interest, and
  to generate, when the ascertained portable monitor movement characteristic corresponds to the physical attribute data of said one of the venues of interest, a record including data representative of the respective venue of interest and time data representative of a time at which the portable monitor is within the predetermined proximity to the respective venue of interest.

53. The portable monitor of claim 52, wherein the physical attribute data identifies a range of speed of travel at which the advertisement represented by the respective venue of interest is perceivable; the portable monitor movement characteristic relates to a speed of travel of the portable monitor so that the processor is operative to generate the record when the speed of travel of the portable monitor is within the identified range of speed of travel of the respective venue of interest.

54. The portable monitor of claim 53, wherein the physical attribute data relates to a size of the advertisement of the respective venue of interest.

55. The portable monitor of claim 52, wherein the physical attribute data identifies a range of directions of travel at which the advertisement represented by the respective venue of interest is perceivable; the portable monitor movement characteristic relates to a direction of travel of the portable monitor so that the processor is operative to generate the record when the direction of travel of the portable monitor is within the identified range of direction of travel of the respective venue of interest.

56. The portable monitor of claim 55, wherein the processor is further operative to ascertain a speed of travel of the portable monitor and is operative to generate the record when the direction of travel of the portable monitor is not within the identified range of direction of travel of the respective venue of interest if the ascertained speed of travel of the portable monitor is below a predetermined threshold.

57. The portable monitor of claim 52, wherein the venue of interest data further identifies locations of the venues of interest.

58. A method for monitoring travel patterns of participants in a market research study, comprising:
 providing a portable monitor to each of a plurality of participants in the market research study, the portable monitor adapted to be carried on the person of one of the participants, and containing a wireless receiver operative to receive one or more position signals, and containing a storage operative to store venue of interest data pertaining to venues of interest pertinent to the market research study, each venue of interest representing a visually viewable advertisement, the venue of interest data including for at least selected ones of each venue of interest physical attribute data identifying a physical attribute of the visually viewable advertisement represented by the respective venue of interest;
 ascertaining a current location of the portable monitor based upon the received one or more position signals;
 assessing whether the portable monitor is within a predetermined proximity to at least one of the venues of interest represented by the venue of interest data;
 ascertaining a portable monitor movement characteristic pertaining to movement of the portable monitor;
 determining whether the ascertained portable monitor movement characteristic corresponds to the physical attribute data of said one of the venues of interest, and
 generating, when the ascertained portable monitor movement characteristic corresponds to the physical attribute data of said one of the venues of interest, a record including data representative of the respective venue of interest and time data representative of a time at which the portable monitor is within the predetermined proximity to the respective venue of interest.

59. The method of claim 58, wherein the physical attribute data identifies a range of speed of travel at which the advertisement represented by the respective venue of interest is perceivable; the portable monitor movement characteristic relates to a speed of travel of the portable monitor; and the determining step is carried out by determining that the ascertained portable monitor movement characteristic corresponds to the physical attribute data of said one of the venues of interest when the speed of travel of the portable monitor is within the identified range of speed of travel of the respective venue of interest.

60. The method of claim 59, wherein the physical attribute data relates to a size of the advertisement of the respective venue of interest.

61. The method of claim 58, wherein the physical attribute data identifies a range of directions of travel at which the advertisement represented by the respective venue of interest is perceivable; the portable monitor movement characteristic relates to a direction of travel of the portable monitor; and the determining step is carried out by determining that the ascertained portable monitor movement characteristic corresponds to the physical attribute data of said one of the venues of interest when the direction of travel of the portable monitor is within the identified range of direction of travel of the respective venue of interest.

62. The method of claim 61, further comprising the step of ascertaining a speed of travel of the portable monitor; and step of generating a record is further carried out when the direction of travel of the portable monitor is not within the identified range of direction of travel of the respective venue of interest if the ascertained speed of travel of the portable monitor is below a predetermined threshold.

63. The method of claim 58, wherein the venue of interest data further identifies locations of the venues of interest.

64. A portable monitor for use in a market research study for monitoring travel and retail establishment visiting patterns of participants in the market research study, comprising:

a wireless receiver operative to receive one or more position signals and to supply position data corresponding to the one or more position signals;

storage operative to store venue of interest data representing locations of venues of interest within a first geographic location pertinent to the market research study; and a processor operative to process the position data to ascertain a current location of the portable monitor, to assess whether the portable monitor is within a predetermined proximity to at least one of the venues of interest based upon the ascertained current location of the portable monitor and the venue of interest data stored in the storage, and to generate, when the processor assesses that the portable monitor is within the predetermined proximity to said at least one of the venues of interest, a record including data representative of the respective venue of interest and time data representative of a time at which the portable monitor is within the predetermined proximity to the respective venue of interest;

the wireless receiver adapted during use of the portable monitor by a participant in the market research study to receive, when the portable monitor is disposed in or near a second geographic location different from the first geographic location, new venue of interest data representing locations of venues of interest in said second geographic location, the new venue of interest data being substantially different from the venue of interest data stored in the storage; the storage being operative to replace previously stored venue of interest data with the new venue of interest data received by the receiver.

65. A method for monitoring travel and retail establishment visiting patterns of participants in a market research study, comprising:

providing a portable monitor to each of a plurality of participants in the market research study, the portable monitor adapted to be carried on the person of one of the participants, and containing a wireless receiver operative to receive one or more position signals, and containing a storage operative to store venue of interest data representing locations of venues of interest within a first geographic location pertinent to the market research study;

ascertaining a current location of the portable monitor based upon the received one or more position signals;

assessing whether the portable monitor is within a predetermined proximity to at least one of the venues of interest represented by the venue of interest data;

generating a record including data representative of the respective venue of interest to which the portable monitor is disposed within the predetermined proximity and time data representative of a time when the portable monitor is assessed to be disposed within the predetermined proximity of the respective venue of interest;

receiving by the portable monitor, when the portable monitor is disposed in or near a second geographic location different from the first geographic location, new venue of interest data representing locations of venues of interest in said second geographic location, the new venue of interest data being substantially different from the venue of interest data stored in the storage; and replacing by the portable monitor the venue of interest data in the storage with the new venue of interest data.

66. A portable monitor for use in a market research study for monitoring travel and retail establishment visiting patterns of participants in the market research study, comprising:

a wireless receiver operatively controlled to receive one or more position signals and to supply position data corresponding to the one or more position signals;

storage operative to store venue of interest data representing locations of venues of interest pertinent to the market research study including first venue of interest data representing locations of a first set of venues of interest and second venue of interest data representing locations of a second set of venues of interest;

a processor operative to control the wireless receiver to receive said one or more position signals at a first rate in a first mode of operation, and to control the wireless receiver to receive said one or more position signals at a second rate in a second mode of operation, the second rate being substantially higher than the first rate, to process the position data to ascertain a current location of the portable monitor, to assess in the first mode of operation whether the portable monitor is within a predetermined proximity to at least one of the venues of interest of the first set of venues of interest; to assess in the second mode of operation whether the portable monitor is within a predetermined proximity to at least one of the venues of interest of either the first set of venues of interest or the second set of venues of interest, and to generate, when the processor assesses that the portable monitor is within the predetermined proximity to at least one of the venues of interest, a record including data representative of the respective venue of interest to which the portable monitor is within the predetermined proximity and time data representative of a time when the portable monitor is within the predetermined proximity to the respective venue of interest.

67. The portable monitor of claim 66, wherein the first set of venues of interest correspond to outdoor advertisements, and the second set of venues of interest correspond to retail establishments.

68. A method for monitoring travel and retail establishment visiting patterns of participants in a market research study, comprising:

providing a portable monitor to each of a plurality of participants in the market research study, the portable monitor adapted to be carried on the person of one of the participants, and containing a wireless receiver operative to receive one or more position signals, and containing a storage operative to store venue of interest data representing locations of venues of interest pertinent to the market research study, wherein the venue of interest data includes first venue of interest data representing locations of a first set of venues of interest and second venue of interest data representing locations of a second set of venues of interest;

selecting a rate of operation of the wireless receiver, the rate being selected from at least one of a first rate and a second rate, the second rate being substantially higher than the first rate;

receiving by the wireless receiver one or more position signals at the selected rate of operation;

ascertaining a current location of the portable monitor based upon the received one or more position signals;

assessing, in the first rate of operation, whether the ascertained current location is within a predetermined proximity to at least one of the venues of interest of the first set of venues of interest;

assessing, in the second rate of operation, whether the ascertained current location is within a predetermined proximity to at least one of the venues of interest of either the first set of venues of interest or the second set of venues of interest;

generating a record including data representative of the respective venue of interest that the portable monitor is assessed to be within the predetermined proximity and time data representative of a time at which the portable monitor is within the predetermined proximity to the respective venue of interest.

69. The method of claim 68, wherein the first set of venues of interest correspond to outdoor advertisements, and the second set of venues of interest correspond to retail establishments.

70. A portable monitor for use in a market research study for monitoring travel and retail establishment visiting patterns of participants in the market research study, comprising:
a wireless receiver operative to receive one or more position signals and to supply position data corresponding to the one or more position signals;
storage operative to store venue of interest data representing locations of venues of interest pertinent to the market research study, at least one of the venues of interest representing a visually viewable advertisement, the venue of interest data including physical attribute data identifying a physical attribute of the visually viewable advertisement represented by the at least one of the venues of interest; and
a processor operative to process the position data to ascertain a current location of the portable monitor, to ascertain a portable monitor movement characteristic pertaining to movement of the portable monitor, and to assess whether the portable monitor is within a visually viewable distance to at least one of the venues of interest based upon the ascertained current location of the portable monitor, the venue of interest data stored in the storage and the ascertained portable monitor movement characteristic, and to generate, when the processor assesses that the portable monitor is within the visually viewable distance to said at least one of the venues of interest, a record including data representative of the respective venue of interest and current time data.

71. The portable monitor of claim 70, wherein the physical attribute data corresponds to a size of the visually viewable advertisement.

72. The portable monitor of claim 70, wherein the portable monitor movement characteristic corresponds to a speed of travel of the portable monitor.

73. A method for monitoring travel patterns of participants in a market research study, comprising:
providing a portable monitor to each of a plurality of participants in the market research study, the portable monitor adapted to be carried on the person of one of the participants, and containing a wireless receiver operative to receive one or more position signals;
providing venue of interest data representing locations of venues of interest pertinent to the market research study, at least one of the venues of interest representing a visually viewable advertisement, the venue of interest data including physical attribute data identifying a physical attribute of the visually viewable advertisement represented by the at least one of the venues of interest;
ascertaining a current location of the portable monitor based upon the received one or more position signals;
ascertaining a portable monitor movement characteristic pertaining to movement of the portable monitor; and
assessing whether the portable monitor is within a visually viewable distance to at least one of the venues of interest based upon the ascertained current location of the portable monitor, the venue of interest data and the ascertained portable monitor movement characteristic.

74. The method of claim 73, wherein the physical attribute data corresponds to a size of the visually viewable advertisement.

75. The method of claim 73, wherein the portable monitor movement characteristic corresponds to a speed of travel of the portable monitor.

\* \* \* \* \*